(12) United States Patent
Muramatsu

(10) Patent No.: US 12,518,925 B2
(45) Date of Patent: *Jan. 6, 2026

(54) MULTILAYER CERAMIC ELECTRONIC COMPONENT

(71) Applicant: Murata Manufacturing Co., Ltd., Nagaokakyo (JP)

(72) Inventor: Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,210

(22) Filed: Jun. 18, 2024

(65) Prior Publication Data

US 2024/0339265 A1 Oct. 10, 2024

Related U.S. Application Data

(63) Continuation of application No. 17/532,268, filed on Nov. 22, 2021, now Pat. No. 12,051,546.

(30) Foreign Application Priority Data

Dec. 24, 2020 (JP) .................................. 2020-214913

(51) Int. Cl.
*H01G 4/232* (2006.01)
*H01G 4/12* (2006.01)
*H01G 4/248* (2006.01)
*H01G 4/30* (2006.01)

(52) U.S. Cl.
CPC .......... *H01G 4/232* (2013.01); *H01G 4/1209* (2013.01); *H01G 4/248* (2013.01); *H01G 4/30* (2013.01)

(58) Field of Classification Search
CPC .......... H01G 4/248; H01G 4/232; H01G 4/30; H01G 4/1209
USPC ..................... 361/301.4, 306.3, 321.3, 321.1
See application file for complete search history.

(56) References Cited

U.S. PATENT DOCUMENTS

| | | | |
|---|---|---|---|
| 8,630,080 B2* | 1/2014 | Iwanaga | H01G 4/005 361/321.1 |
| 2018/0082793 A1* | 3/2018 | Satoh | H01G 4/2325 |
| 2019/0318874 A1* | 10/2019 | Orimo | H05K 1/181 |
| 2020/0029438 A1 | 1/2020 | Sasaki | |
| 2020/0118755 A1* | 4/2020 | Yajima | H01G 4/232 |
| 2020/0281078 A1 | 9/2020 | Takahashi | |
| 2021/0329786 A1 | 10/2021 | Sasaki | |
| 2021/0400816 A1 | 12/2021 | Takahashi | |

FOREIGN PATENT DOCUMENTS

JP 2015035589 A 2/2015

OTHER PUBLICATIONS

Muramatsu, "Multilayer Ceramic Electronic Component", U.S. Appl. No. 17/532,268, filed Nov. 22, 2021.

* cited by examiner

*Primary Examiner* — Arun Ramaswamy
(74) *Attorney, Agent, or Firm* — Keating & Bennett, LLP

(57) ABSTRACT

A multilayer ceramic capacitor includes a multilayer body including layered ceramic layers and internal electrode layers, and an external electrode on a side surface of the multilayer body and connected to the internal electrode layers. A recess is provided in a surface of the external electrode on one side of opposing main surfaces of the multilayer ceramic capacitor.

12 Claims, 17 Drawing Sheets

FIG.6
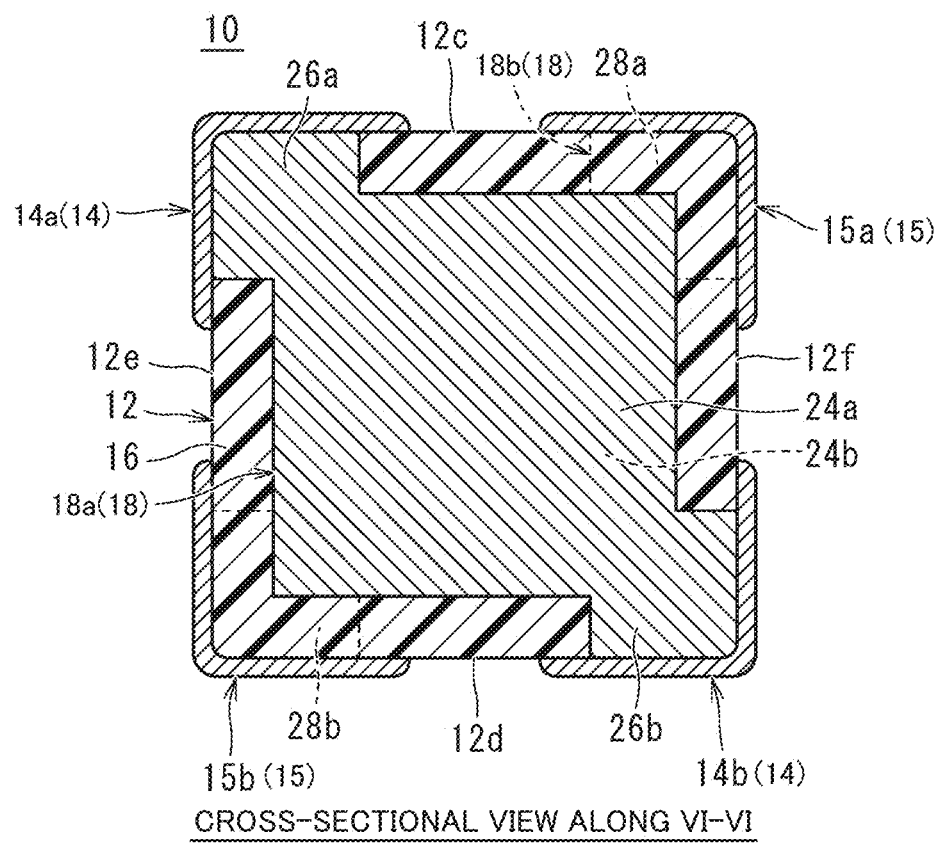
CROSS-SECTIONAL VIEW ALONG VI-VI
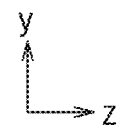

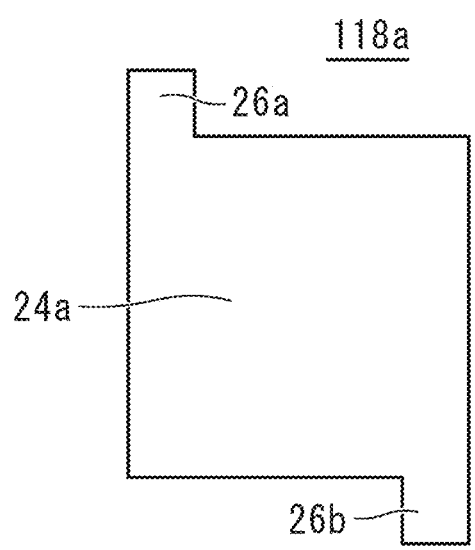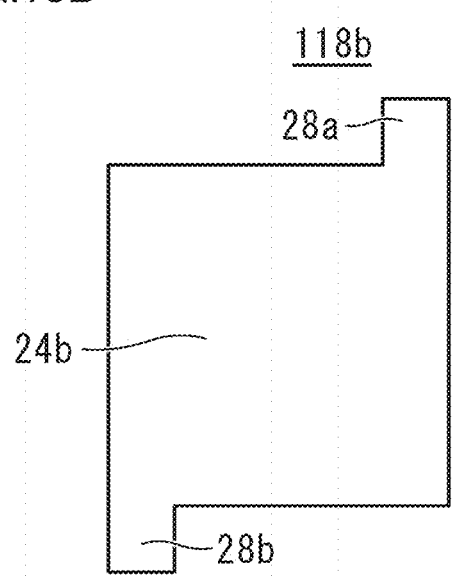

MULTILAYER CERAMIC ELECTRONIC COMPONENT

CROSS REFERENCE TO RELATED APPLICATIONS

This application claims the benefit of priority to Japanese Patent Application No. 2020-214913 filed on Dec. 24, 2020. The entire contents of this application are hereby incorporated herein by reference.

BACKGROUND OF THE INVENTION

1. Field of the Invention

The present invention relates to a multilayer ceramic electronic component.

2. Description of the Related Art

An electronic device such as a portable telephone or a portable music player has recently been reduced in size and/or thickness. A large number of multilayer ceramic electronic components are mounted on the electronic device. With reduction in size of the electronic device, the multilayer ceramic electronic component mounted on the electronic device as being embedded in a substrate or mounted on a surface of the substrate has also increasingly been reduced in size and/or thickness. With such reduction in thickness of a multilayer ceramic capacitor, the strength of the multilayer ceramic capacitor has been an issue.

A multilayer ceramic capacitor as described in Japanese Patent Laid-Open No. 2015-65394 has been proposed as a multilayer ceramic electronic component having improved strength of a chip. This multilayer ceramic capacitor is a multilayer ceramic capacitor to be embedded in a board, in which a thickness of a ceramic body in an entire chip is increased by not allowing for an increase in a thickness of an external electrode while forming a band surface of the external electrode to have a predetermined length or greater for connecting the external electrode to an external wiring through a via hole, such that the occurrence of damage such as breakage or the like may be prevented.

The multilayer ceramic capacitor to be embedded in a board as described in Japanese Patent Laid-Open No. 2015-65394 achieves improved flatness of the external electrode with a reduction in thickness, and thus a height difference at a surface of the multilayer ceramic capacitor to be embedded in a board is reduced.

Thus, in visual inspection with an image sensor or the like of a mounter for mounting the multilayer ceramic capacitor to be embedded in a board, luminance of light reflected at the surface of the multilayer ceramic capacitor to be embedded in a board increases, which may lead to halation and failure in accurate recognition.

The problem arises in a general surface-mount multilayer ceramic capacitor having improved flatness of the external electrode with a reduction in thickness, without being limited to the multilayer ceramic capacitor to be embedded in a board as in Japanese Patent Laid-Open No. 2015-65394.

SUMMARY OF THE INVENTION

Preferred embodiments of the present invention provide multilayer ceramic electronic components, an appearance of each of which can be accurately checked even when having improved flatness and a reduction in thickness.

A multilayer ceramic electronic component according to a preferred embodiment of the present invention includes a multilayer body including a plurality of layered ceramic layers and a plurality of internal electrode layers, the multilayer body including a first main surface and a second main surface opposed to each other in a height direction, a first side surface and a second side surface opposed to each other in a width direction orthogonal or substantially orthogonal to the height direction, and a third side surface and a fourth side surface opposed to each other in a length direction orthogonal or substantially orthogonal to the height direction and the width direction, and a plurality of external electrodes on side surfaces of the multilayer body. The plurality of internal electrode layers include a plurality of first internal electrode layers and a plurality of second internal electrode layers, the plurality of first internal electrode layers and the plurality of second internal electrode layers being alternately layered with the ceramic layers being interposed. Each of the first internal electrode layers includes a first drawn portion extending to at least one of the first side surface, the second side surface, the third side surface, and the fourth side surface and a second drawn portion extending to at least one side surface other than the side surface to which the first drawn portion extends. Each of the second internal electrode layers includes a third drawn portion extending to at least one of the first side surface, the second side surface, the third side surface, and the fourth side surface and a fourth drawn portion extending to at least one side surface other than the side surface to which the third drawn portion extends. The plurality of external electrodes include a first external electrode connected to the first drawn portion and covering a portion of the first main surface, a portion of the second main surface, a portion of the first side surface, and a portion of the third side surface, a second external electrode connected to the second drawn portion and covering a portion of the first main surface, a portion of the second main surface, a portion of the second side surface, and a portion of the fourth side surface, a third external electrode connected to the third drawn portion and covering a portion of the first main surface, a portion of the second main surface, a portion of the first side surface, and a portion of the fourth side surface, and a fourth external electrode connected to the fourth drawn portion and covering a portion of the first main surface, a portion of the second main surface, a portion of the second side surface, and a portion of the third side surface. A recess is in a surface of at least two external electrodes of the first external electrode to the fourth external electrode located on one of the first main surface and the second main surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a cross-sectional view along the line VI-VI of the multilayer ceramic capacitor shown in FIG. 1.

FIG. 18A is a diagram showing a pattern of a first internal electrode layer of the multilayer ceramic capacitor shown in FIG. 13.

FIG. 18B is a diagram showing a pattern of a second internal electrode layer of the multilayer ceramic capacitor shown in FIG. 13.

DETAILED DESCRIPTION OF THE PREFERRED EMBODIMENTS

Preferred embodiments of the present invention will be described in detail below with reference to the drawings.

1. First Preferred Embodiment (1) Multilayer Ceramic Electronic Component

A multilayer ceramic capacitor as an example of a multilayer ceramic electronic component according to a first preferred embodiment of the present invention will be described below.

Figure 1:
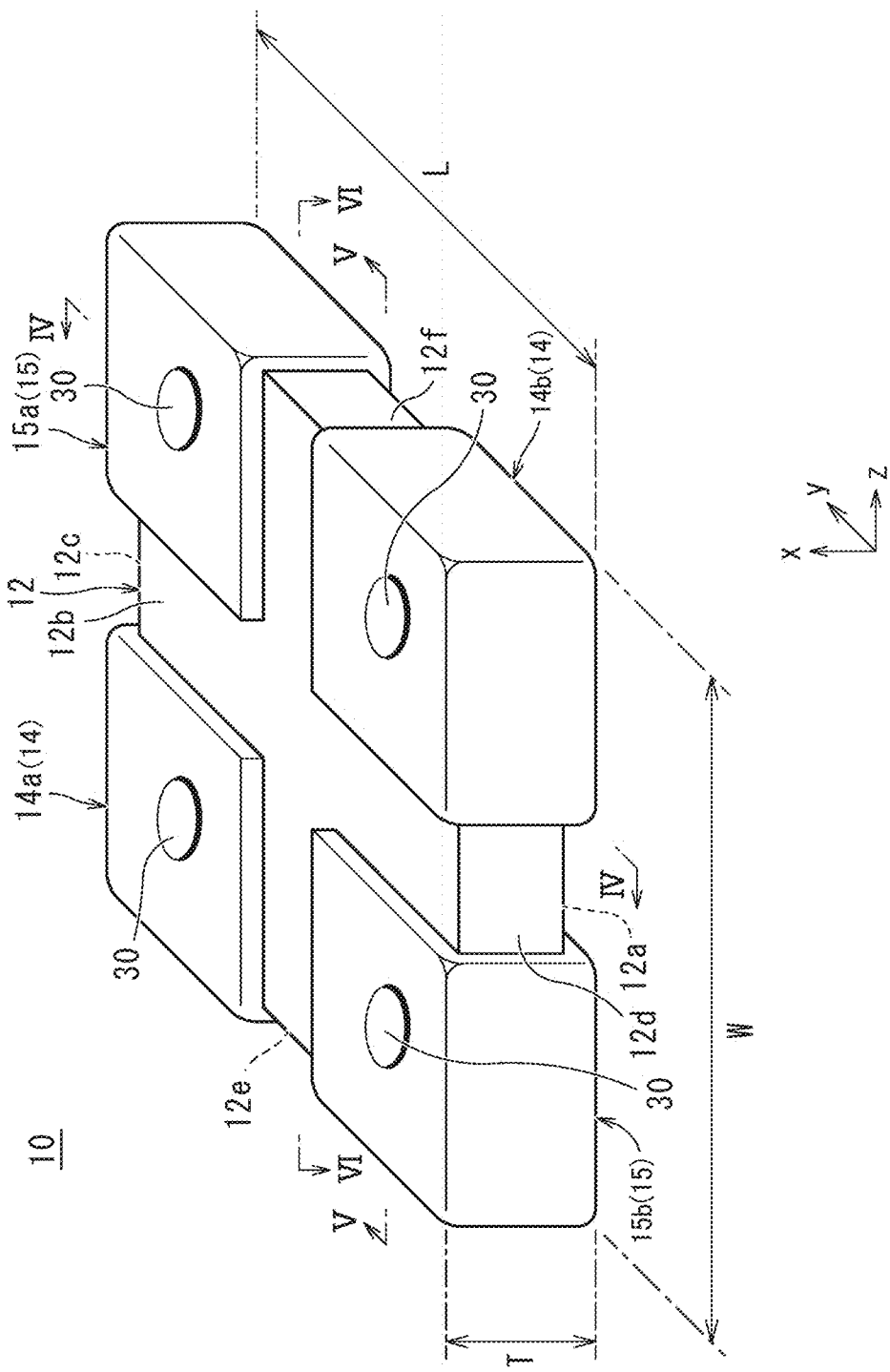
FIG. 1 is a perspective view of a multilayer ceramic capacitor as an example of a multilayer ceramic electronic component according to a first preferred embodiment of the present invention.
Figure 2:
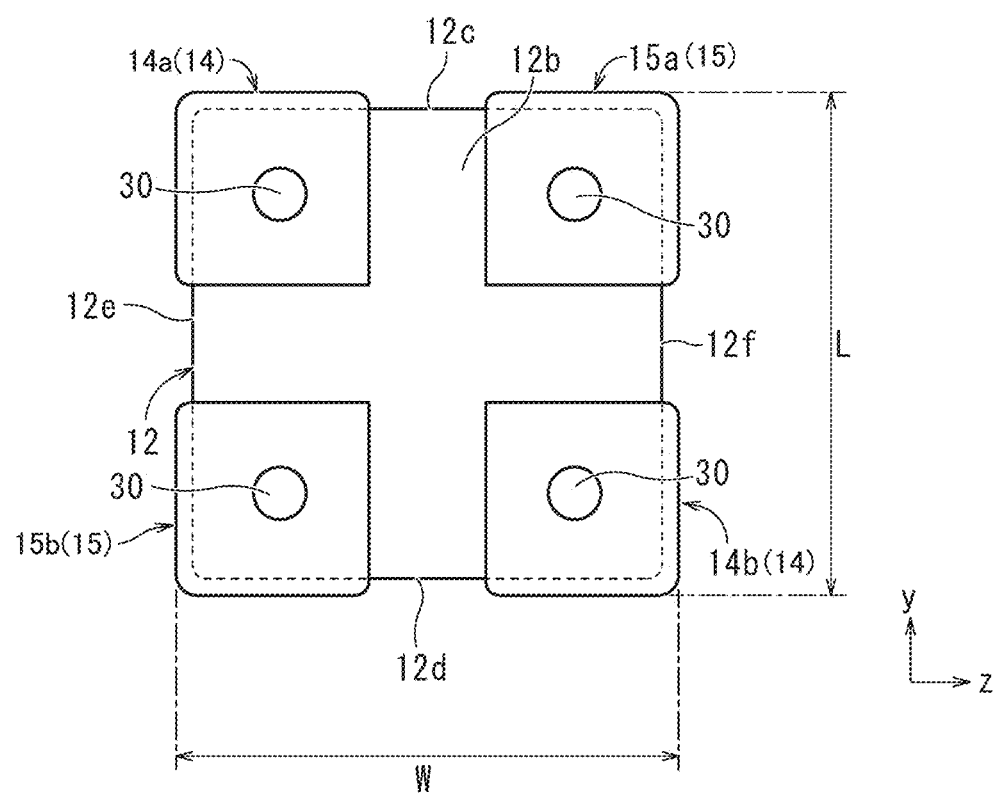
FIG. 2 is a top view of the multilayer ceramic capacitor shown in FIG. 1.
Figure 3:
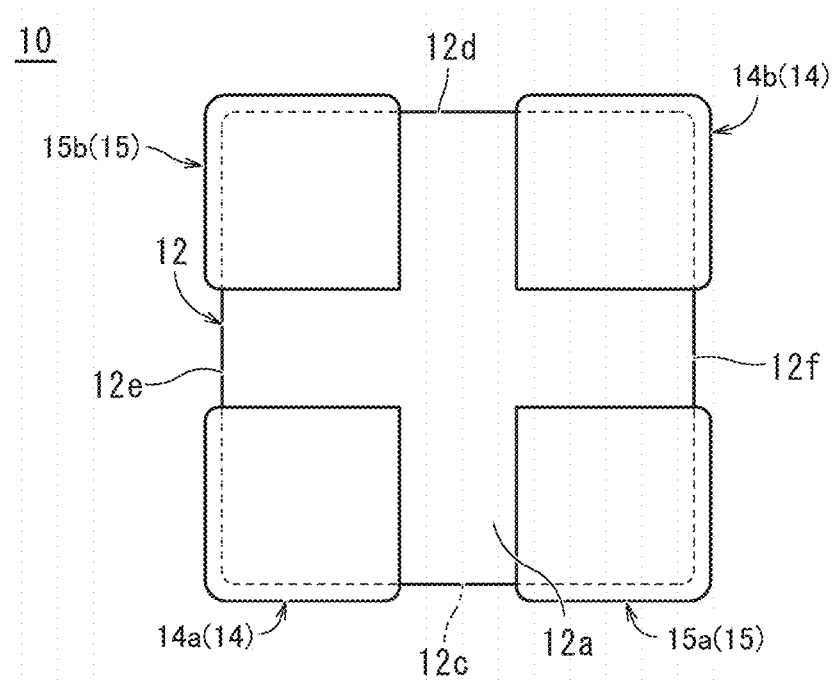
FIG. 3 is a bottom view of the multilayer ceramic capacitor shown in FIG. 1.
Figure 4:
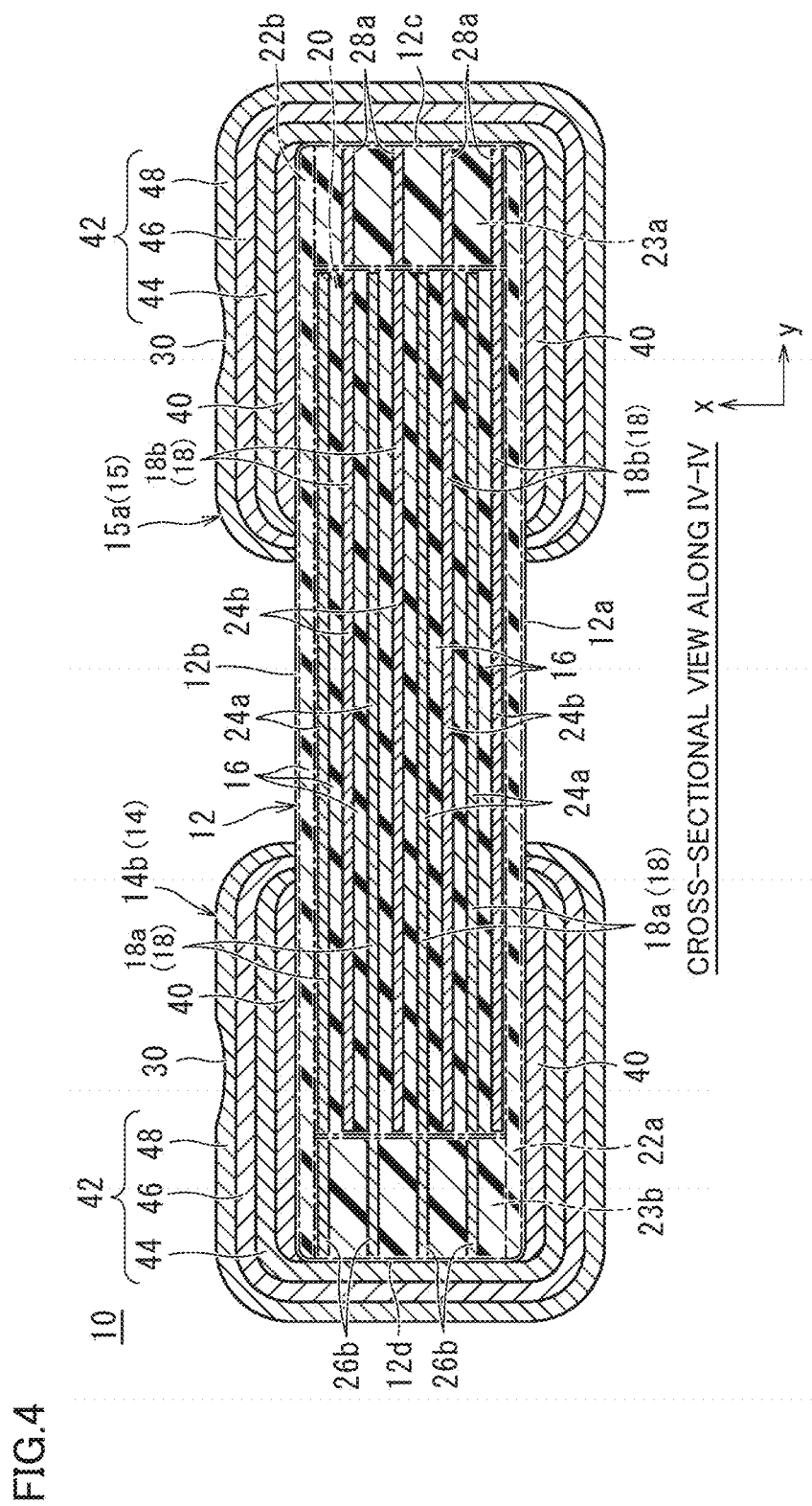
FIG. 4 is a cross-sectional view along the line IV-IV of the multilayer ceramic capacitor shown in FIG. 1.
Figure 5:
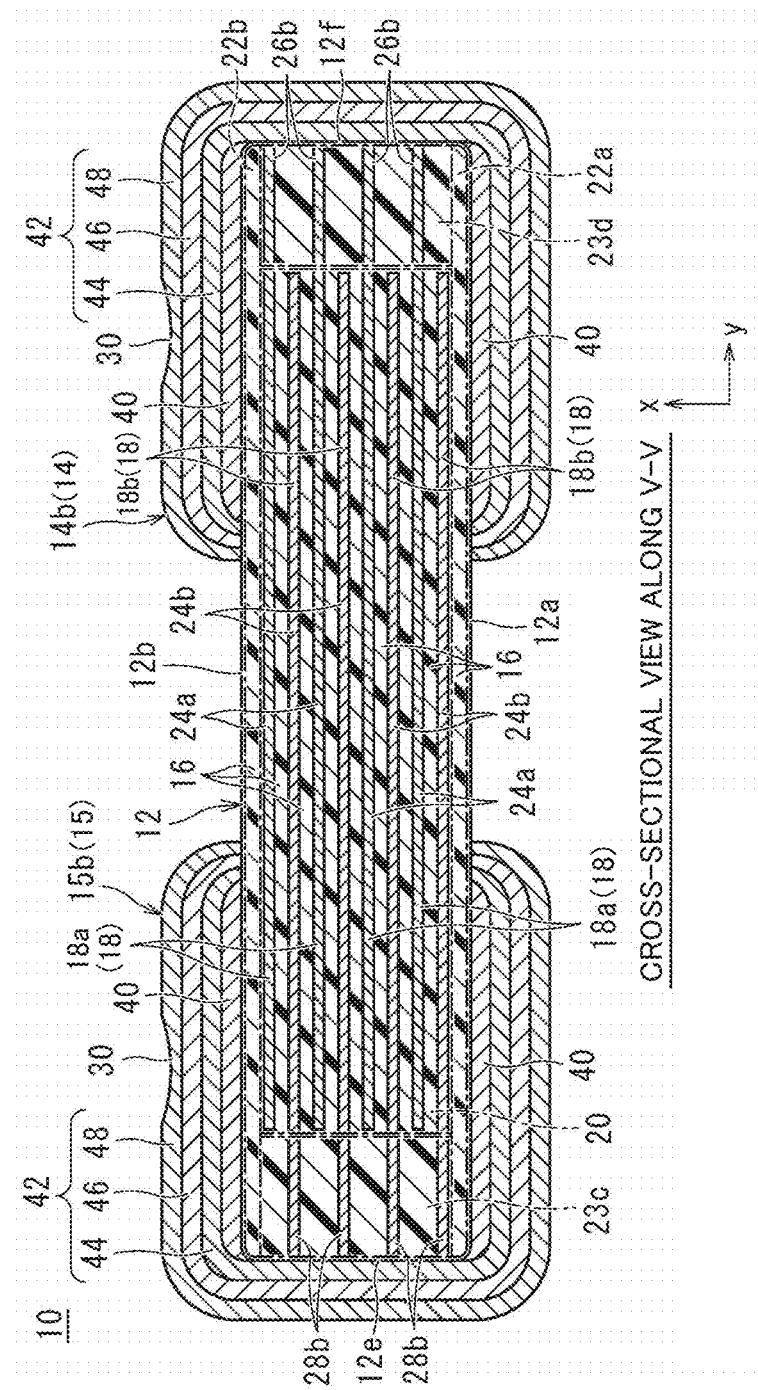
FIG. 5 is a cross-sectional view along the line V-V of the multilayer ceramic capacitor shown in FIG. 1.
Figure 7:
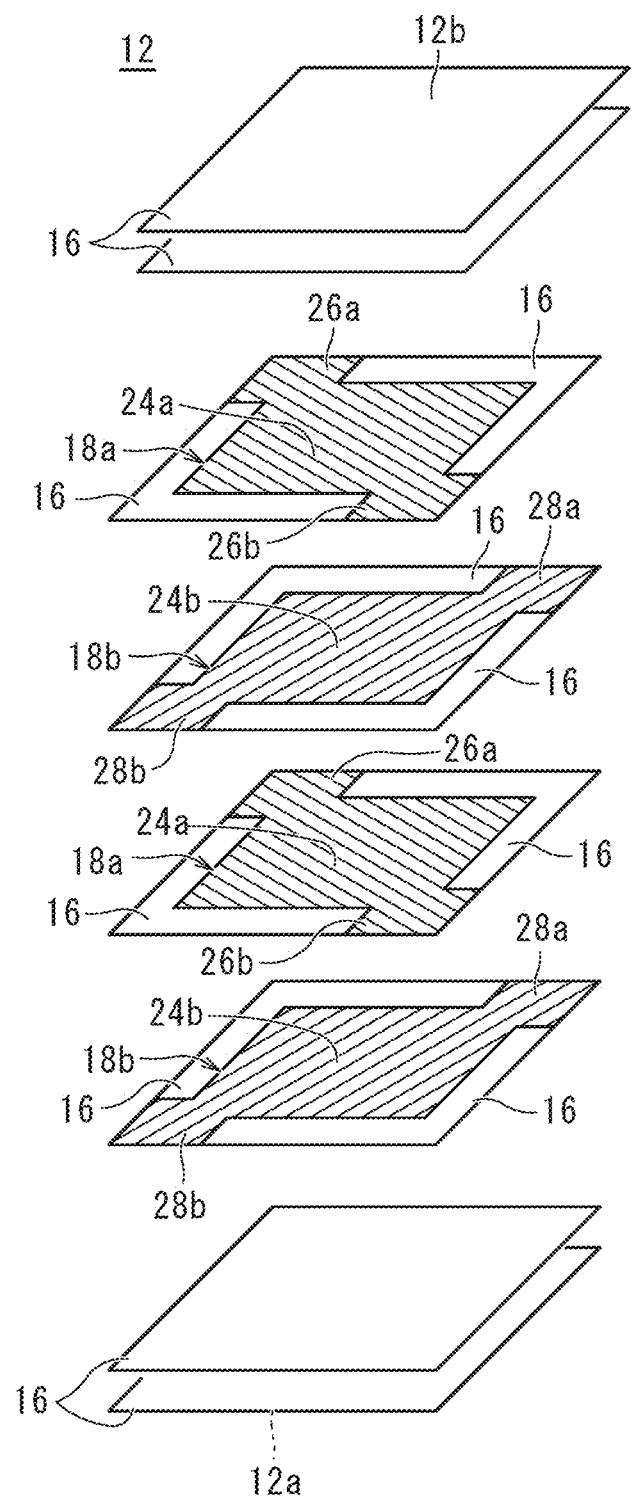
FIG. 7 is an exploded perspective view of a multilayer body shown in FIGS. 1 to 6.
Figure 8A:
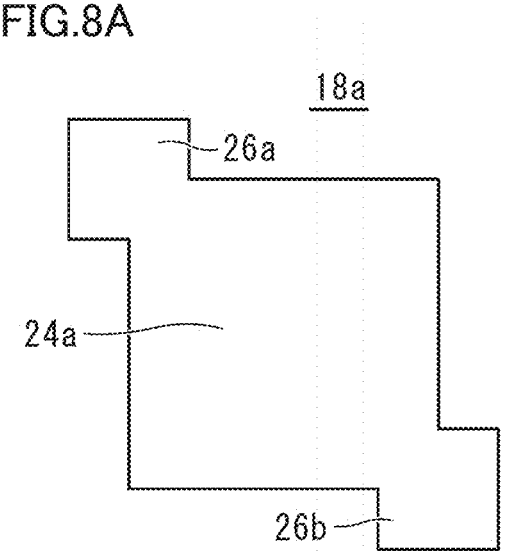
FIG. 8A is a diagram showing a pattern of a first internal electrode layer of the multilayer ceramic capacitor shown in FIG. 1.
Figure 8B:
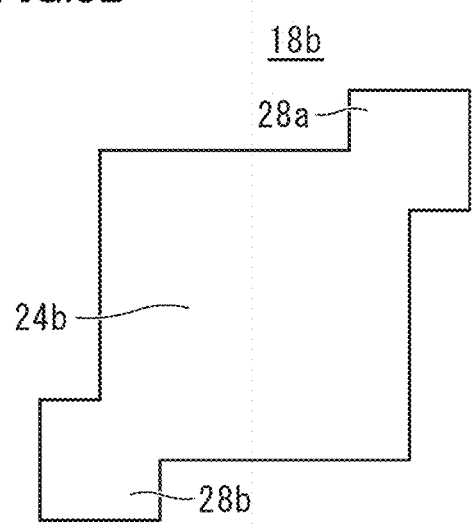
FIG. 8B is a diagram showing a pattern of a second internal electrode layer of the multilayer ceramic capacitor shown in FIG. 1.

FIG. 1 is a perspective view of a multilayer ceramic capacitor as an example of a multilayer ceramic electronic component according to the first preferred embodiment of the present invention. FIG. 2 is a top view of the multilayer ceramic capacitor shown in FIG. 1. FIG. 3 is a bottom view of the multilayer ceramic capacitor shown in FIG. 1. FIG. 4 is a cross-sectional view along the line IV-IV of the multilayer ceramic capacitor shown in FIG. 1. FIG. 5 is a cross-sectional view along the line V-V of the multilayer ceramic capacitor shown in FIG. 1. FIG. 6 is a cross-sectional view along the line VI-VI of the multilayer ceramic capacitor shown in FIG. 1. FIG. 7 is an exploded perspective view of a multilayer body shown in FIGS. 1 to 6. FIG. 8A is a diagram showing a pattern of a first internal electrode layer of the multilayer ceramic capacitor shown in FIG. 1. FIG. 8B is a diagram showing a pattern of a second internal electrode layer of the multilayer ceramic capacitor shown in FIG. 1.

A multilayer ceramic capacitor 10 includes a multilayer body 12 having a parallelepiped shape and external electrodes 14 and 15.

Multilayer body 12 includes a plurality of ceramic layers 16 and a plurality of internal electrode layers 18. Multilayer body 12 includes a first main surface 12a and a second main surface 12b opposed to each other in a height direction x, a first side surface 12c and a second side surface 12d opposed to each other in a length direction y orthogonal or substantially orthogonal to height direction x, and a third side surface 12e and a fourth side surface 12f opposed to each other in a width direction z orthogonal or substantially orthogonal to height direction x and length direction y. First main surface 12a and second main surface 12b extend along length direction y and width direction z. First side surface 12c and second side surface 12d extend along height direction x and width direction z. Third side surface 12e and fourth side surface 12f extend along height direction x and length direction y. Therefore, height direction x refers to a direction of connection between first main surface 12a and second main surface 12b, length direction y refers to a direction of connection between first side surface 12c and second side surface 12d, and width direction z refers to a direction of connection between third side surface 12e and fourth side surface 12f.

Multilayer body 12 preferably includes a corner and a ridgeline that are rounded. The corner refers to a portion where three surfaces of multilayer body 12 meet one another and the ridgeline refers to a portion where two surfaces of multilayer body 12 meet each other. Projections and recesses or the like may be provided in a portion or the entirety of first main surface 12a and second main surface 12b, first side surface 12c and second side surface 12d, and third side surface 12e and fourth side surface 12f.

The number of ceramic layers 16, inclusive of an outer layer, is preferably set to at least ten and at most seven hundred, for example.

Multilayer body 12 includes an inner layer portion 20 including a single ceramic layer 16 or a plurality of ceramic layers 16 and a plurality of internal electrode layers 18 provided thereon. In inner layer portion 20, a plurality of internal electrode layers 18 are opposed to each other.

Multilayer body 12 includes a first main-surface-side outer layer portion 22a located on a side of first main surface 12a and including a plurality of ceramic layers 16 located between first main surface 12a and an outermost surface of inner layer portion 20 on the side of first main surface 12a and a straight line extending from the outermost surface.

Similarly, multilayer body 12 includes a second main-surface-side outer layer portion 22b located on a side of second main surface 12b and including a plurality of ceramic layers 16 located between second main surface 12b and an outermost surface of inner layer portion 20 on the side of second main surface 12b and a straight line extending from the outermost surface.

Multilayer body 12 includes a first side-surface-side outer layer portion 23a located on a side of first side surface 12c and including a plurality of ceramic layers 16 located between first side surface 12c and an outermost surface of inner layer portion 20 on the side of first side surface 12c.

Similarly, multilayer body 12 includes a second side-surface-side outer layer portion 23b located on a side of second side surface 12d and including a plurality of ceramic layers 16 located between second side surface 12d and an outermost surface of inner layer portion 20 on the side of second side surface 12d.

Multilayer body 12 includes a third side-surface-side outer layer portion 23c located on a side of third side surface 23e and including a plurality of ceramic layers 16 located between third side surface 12e and an outermost surface of inner layer portion 20 on the side of third side surface 12e.

Similarly, multilayer body 12 includes a fourth side-surface-side outer layer portion 23d located on a side of fourth side surface 12f and including a plurality of ceramic layers 16 located between fourth side surface 12f and an outermost surface of inner layer portion 20 on the side of fourth side surface 12f.

First main-surface-side outer layer portion 22a is an assembly of a plurality of ceramic layers 16 located on the side of first main surface 12a of multilayer body 12 and located between first main surface 12a and internal electrode layer 18 closest to first main surface 12a.

Second main-surface-side outer layer portion 22b is an assembly of a plurality of ceramic layers 16 located on the side of second main surface 12b of multilayer body 12 and located between second main surface 12b and internal electrode layer 18 closest to second main surface 12b.

Figure 10:
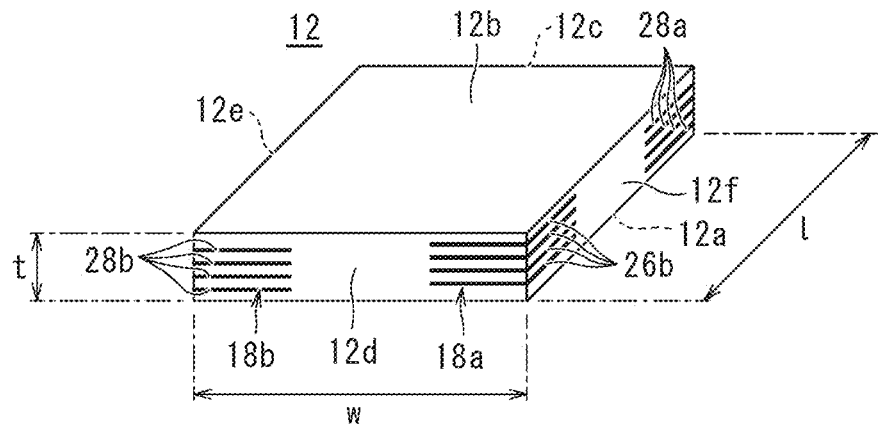
FIG. 10 is a perspective view of the multilayer body of the multilayer ceramic capacitor in FIG. 1.

As shown in FIG. 10, with a dimension in length direction y of multilayer body 12 being denoted as a dimension l, dimension l is, for example, not less than about 0.43 mm and not greater than about 0.73 mm. With a dimension in width direction z being denoted as a dimension w, a relationship between dimension w and dimension l satisfies about $0.85 \leq w/l \leq$ about 1.0, for example. With a dimension in height direction x being denoted as a t dimension, the t dimension is preferably not less than about 50 μm and not greater than about 90 μm, for example.

Ceramic layer 16 can be made of, for example, a dielectric material as a ceramic material. For example, dielectric ceramics including a component such as $BaTiO_3$, $CaTiO_3$, $SrTiO_3$, or $CaZrO_3$ can be used as a dielectric material. When the aforementioned dielectric material is included as a main component, depending on a desired characteristic of multilayer body 12, for example, a sub-component lower in content than the main component, such as an Mn compound, an Fe compound, a Cr compound, a Co compound, or an Ni compound may be added.

When piezoelectric ceramic is used for multilayer body 12, the multilayer ceramic electronic component defines and functions as a ceramic piezoelectric element. Specific examples of a piezoelectric ceramic material include a lead zirconate titanate (PZT) based ceramic material.

When semiconductor ceramic is used for multilayer body 12, the multilayer ceramic electronic component defines and functions as a thermistor element. Specific examples of a semiconductor ceramic material include a spinel-based ceramic material.

When magnetic ceramic is used for multilayer body 12, the multilayer ceramic electronic component defines and functions as an inductor element. When the multilayer ceramic electronic component defines and functions as the inductor element, internal electrode layer 18 is, for example, a coil conductor. Specific examples of the magnetic ceramic material include a ferrite ceramic material.

Ceramic layer 16 between internal electrode layers 18 preferably has an average thickness, for example, not less than about 0.4 μm and not greater than about 5 μm.

In multilayer ceramic capacitor 10, as shown in FIGS. 4 to 6, in multilayer body 12, internal electrode layers 18 are alternately layered with ceramic layer 16 being interposed therebetween.

Multilayer body 12 includes a plurality of first internal electrode layers 18a and a plurality of second internal electrode layers 18b as the plurality of internal electrode layers 18. First internal electrode layer 18a and second internal electrode layer 18b are alternately layered with ceramic layer 16 being interposed therebetween.

First internal electrode layer 18a is provided on a surface of ceramic layer 16. First internal electrode layer 18a includes a first opposing portion 24a opposed to first main surface 12a and second main surface 12b and is layered in the direction of connection between first main surface 12a and second main surface 12b.

Second internal electrode layer 18b is provided on a surface of ceramic layer 16 different from ceramic layer 16 on which first internal electrode layer 18a is provided. Second internal electrode layer 18b includes a second opposing portion 24b opposed to first main surface 12a and second main surface 12b and is layered in the direction of connection between first main surface 12a and second main surface 12b.

First internal electrode layer 18a extends to first side surface 12c and third side surface 12e of multilayer body 12 by a first drawn portion 26a and extends to second side surface 12d and fourth side surface 12f of multilayer body 12 by a second drawn portion 26b. A width over which first drawn portion 26a extends to first side surface 12c may be equal or substantially equal to a width over which first drawn portion 26a extends to third side surface 12e, and a width over which second drawn portion 26b extends to second side surface 12d may be equal or substantially equal to a width over which second drawn portion 26b extends to fourth side surface 12f.

In other words, first drawn portion 26a extends toward third side surface 12e of multilayer body 12 and second drawn portion 26b extends toward fourth side surface 12f of multilayer body 12.

Second internal electrode layer 18b extends to first side surface 12c and fourth side surface 12f of multilayer body 12 by a third drawn portion 28a and extends to second side surface 12d and third side surface 12e of multilayer body 12 by a fourth drawn portion 28b. A width over which third drawn portion 28a extends to first side surface 12c may be equal or substantially equal to a width over which third drawn portion 28a extends to fourth side surface 12f and a width over which fourth drawn portion 28b extends to second side surface 12d may be equal or substantially equal to a width over which fourth drawn portion 28b extends to third side surface 12e.

In other words, third drawn portion 28a extends toward fourth side surface 12f of multilayer body 12 and fourth drawn portion 28b extends toward third side surface 12e of multilayer body 12.

First opposing portion 24a of first internal electrode layer 18a is preferably, for example, rectangular or substantially rectangular, although the shape is not particularly limited. The corner may be rounded or beveled.

Second opposing portion 24b of second internal electrode layer 18b is preferably, for example, rectangular or substantially rectangular, although the shape is not particularly limited. The corner may be rounded or beveled.

First drawn portion 26a of first internal electrode layer 18a is preferably, for example, rectangular or substantially rectangular, although the shape is not particularly limited. The corner may be rounded or beveled (tapered). The first drawn portion may be tapered so as to be inclined in any direction.

Second drawn portion 26b of first internal electrode layer 18a is preferably, for example, rectangular or substantially rectangular, although the shape is not particularly limited. The corner may be rounded or beveled (tapered). The second drawn portion may be tapered so as to be inclined in any direction.

Third drawn portion 28a of second internal electrode layer 18b is preferably, for example, rectangular or substantially rectangular, although the shape is not particularly limited. The corner may be rounded or beveled (tapered). The third drawn portion may be tapered so as to be inclined in any direction.

Fourth drawn portion 28b of second internal electrode layer 18b is preferably, for example, rectangular or substantially rectangular, although the shape is not particularly limited. The corner may be rounded or beveled (tapered). The fourth drawn portion may be tapered so as to be inclined in any direction.

First opposing portion 24a of first internal electrode layer 18a has a larger width than first drawn portion 26a of first internal electrode layer 18a.

First opposing portion 24a of first internal electrode layer 18a has a larger width than second drawn portion 26b of first internal electrode layer 18a.

Second opposing portion 24b of second internal electrode layer 18b has a larger width than third drawn portion 28a of second internal electrode layer 18b.

Second opposing portion 24b of second internal electrode layer 18b has a larger width than fourth drawn portion 28b of second internal electrode layer 18b.

Internal electrode layer 18 can be made of a metal such as, for example, Ni, Cu, Ag, Pd, or Au and an alloy including at least one of those metals, such as an Ag—Pd alloy. The number of layered internal electrode layers 18 is preferably not less than ten and not greater than seven hundred, for example. Internal electrode layer 18 preferably has an average thickness of preferably not less than about 0.2 µm and not greater than about 2.0 µm.

A plurality of external electrodes 14 and 15 are provided on first main surface 12a, second main surface 12b, and first side surface 12c to fourth side surface 12f of multilayer body 12.

External electrode 14 includes a first external electrode 14a electrically connected to first drawn portion 26a of first internal electrode layer 18a and a second external electrode 14b electrically connected to second drawn portion 26b.

First external electrode 14a is covers first drawn portion 26a on first side surface 12c and third side surface 12e and further covers a portion of first main surface 12a and second main surface 12b. Second external electrode 14b covers second drawn portion 26b on second side surface 12d and fourth side surface 12f and further covers a portion of first main surface 12a and second main surface 12b.

External electrode 15 includes a third external electrode 15a electrically connected to third drawn portion 28a of second internal electrode layer 18b and a fourth external electrode 15b electrically connected to fourth drawn portion 28b.

Third external electrode 15a covers third drawn portion 28a on first side surface 12c and fourth side surface 12f and further covers a portion of first main surface 12a and second main surface 12b. Fourth external electrode 15b covers fourth drawn portion 28b on second side surface 12d and third side surface 12e and further covers a portion of first main surface 12a and second main surface 12b.

In multilayer body 12, an electrical characteristic (for example, a capacitance) is provided due to first opposing portion 24a and second opposing portion 24b being opposed to each other with ceramic layer 16 being interposed therebetween. Therefore, the capacitance can be obtained between first external electrode 14a and second external electrode 14b to which first internal electrode layer 18a is connected and third external electrode 15a and fourth external electrode 15b to which second internal electrode layer 18b is connected. Therefore, multilayer ceramic capacitor 10 defines and functions as a capacitor.

A recess 30 is provided in a surface of at least two external electrodes 14 and 15 of first external electrode 14a, second external electrode 14b, third external electrode 15a, and fourth external electrode 15b located on any one of first main surface 12a and second main surface 12b. Since flatness of an external electrode surface is reduced, during visual inspection with an image sensor or the like of a mounter during mounting multilayer ceramic capacitor 10, luminance of light reflected at the surface of multilayer ceramic capacitor 10 can be reduced or prevented. Consequently, halation can be reduced or prevented and the appearance of multilayer ceramic capacitor 10 can be accurately recognized.

Recess 30 has a size (area) preferably, for example, not less than about 1.1% and not greater than about 34.9% of an area of external electrode 14 or 15 on first main surface 12a or second main surface 12b where recess 30 is provided. Since flatness of the external electrode surface can be reduced and luminance of reflected light can be reduced or prevented, halation can be more effectively reduced or prevented. Consequently, the appearance of multilayer ceramic capacitor 10 can be more accurately recognized.

When the size of recess 30 is less than about 1.1% of the area of external electrode 14 or 15 on first main surface 12a or second main surface 12b where recess 30 is provided, luminance of light reflected at the external electrode surface is not reduced or prevented and halation occurs at external electrode 14 or 15 at the time of mounting. Then, more accurate recognition of the appearance of multilayer ceramic capacitor 10 cannot be achieved and detection of a chip based on the appearance may not be successful. When the size of recess 30 is greater than about 34.9% of the area of external electrode 14 or 15 on first main surface 12a or second main surface 12b where recess 30 is provided, the appearance of the external electrode surface is poor and mountability with solder may become poor.

The size (area) of recess 30 is calculated as described below.

Specifically, in calculating the area of recess 30 in the external electrode surface, initially, in an LW plane of multilayer ceramic capacitor 10, with a surface where recess 30 is present in external electrode 14 or 15 facing up, a profile in the height direction of entire multilayer ceramic capacitor 10 is measured with a laser displacement gauge.

Thereafter, maximum dimensions in length direction y and width direction z of recess 30 are measured and measurement values are multiplied by each other to calculate the size (area) of recess 30. Recess 30 starts from a portion where the height continuously decreases in the profile and ends at a portion where the height returns to the height of a planar portion.

Recess 30 has a depth preferably, for example, not less than about 2.5% and not greater than about 40% of a thickness of a third plated layer 48 which will be described later. In other words, recess 30 does not extend through third plated layer 48. Flatness of the external electrode surface is thus reduced, luminance of reflected light can be reduced or prevented, and an advantageous effect of reduction or prevention of halation can be obtained.

When the depth of recess 30 is less than about 2.5% of the thickness of third plated layer 48 which will be described later, luminance of light reflected at the external electrode surface is not reduced or prevented and detection of a chip may not be successful due to halation at the time of mounting. When the depth of recess 30 is greater than about 40% of the thickness of third plated layer 48, the appearance of the external electrode surface may be poor, mountability with solder may be poor, and damage may propagate to multilayer body 12, which may lead to a defective structure.

The shape of recess 30 is not particularly limited.

The thickness of third plated layer 48 and the depth of recess 30 are calculated as described below.

Specifically, initially, in calculating the thickness of third plated layer 48, multilayer ceramic capacitor 10 is polished from any of first side surface 12c to fourth side surface 12f as being parallel or substantially parallel to the polished side surface to expose a cross-section (an LT cross-section) as shown in FIG. 4. In the exposed cross-section, a thickness of third plated layer 48 along the height direction in which first main surface 12a and second main surface 12b are connected to each other can be measured with a microscope.

Then, in calculating the depth of recess 30, a length of a normal from a reference line along the outermost surface of external electrode 14 or 15 to a lowest point of recess 30 can be measured with a microscope in the exposed cross-section. The cross-section (LT cross-section) at a position about ½ the length in length direction y or width direction z of recess 30 is exposed.

Then, a ratio of recess 30 to third plated layer 48 can be calculated based on the thickness of third plated layer 48 and the depth of recess 30 calculated above.

Recess 30 has a diameter preferably, for example, not less than about 20 µm and not greater than about 150 µm.

The diameter of recess 30 is measured with a method described below.

Specifically, initially, in an LW plane of multilayer ceramic capacitor 10, with a surface of external electrode 14 or 15 including an indentation facing up, a profile in the height direction of entire multilayer ceramic capacitor 10 is measured with a laser displacement gauge.

Thereafter, maximum dimensions in length direction y and width direction z of recess 30 are measured and an average value thereof is defined as the diameter of recess 30. Recess 30 starts from a portion where the height continuously decreases in the profile and ends at a portion where the height returns to the height of the planar portion.

Although a position where recess 30 is provided is not particularly limited, it is preferably provided in the center or approximate center of the external electrode.

Although a plurality of recesses 30 may be provided, at least one recess 30 is preferably provided in the surface of each of external electrodes 14 and 15.

External electrodes 14 and 15 each include an underlying electrode layer 40 and a plated layer 42 sequentially from the side of multilayer body 12.

Underlying electrode layer 40 preferably defines and functions as a thin electrode including, for example, at least one selected from among Ni, Cr, Cu, and Ti. The thin electrode is preferably formed with a thin film formation method such as sputtering or vapor deposition, for example.

Underlying electrode layer 40 covers a portion of the first main surface and a portion of the second main surface.

Underlying electrode layer 40 has a thickness of preferably, for example, not less than about 50 nm and not greater than about 400 nm and further preferably, for example, not less than about 50 nm and not greater than about 130 nm.

Plated layer 42 preferably includes a first plated layer 44 on underlying electrode layer 40 and on first side surface 12c to fourth side surface 12d, a second plated layer 46 on first plated layer 44, and third plated layer 48 on second plated layer 46. Reliability of external electrodes 14 and 15 can thus be ensured.

First plated layer 44 is preferably, for example, made of a Cu plated layer. Entry of moisture such as a plating solution can thus be reduced or prevented.

First plated layer 44 covers underlying electrode layer 40 and a portion of first side surface 12c, a portion of second side surface 12b, a portion of third side surface 12e, and a portion of fourth side surface 12f.

First plated layer 44 has a thickness of preferably, for example, not less than about 2 µm and not greater than about 8 µm.

Second plated layer 46 is preferably, for example, a Ni plated layer. Erosion of a lower plated layer by solder in mounting multilayer ceramic capacitor 10 can thus be reduced or prevented.

Second plated layer 46 covers first plated layer 44.

Second plated layer 46 has a thickness of preferably, for example, not less than about 2 µm and not greater than about 4 µm.

Third plated layer 48 is preferably, for example, an Sn plated layer. Solderability in mounting multilayer ceramic capacitor 10 can thus be improved and multilayer ceramic capacitor 10 can be easily mounted.

Third plated layer 48 covers second plated layer 46.

Third plated layer 48 has a thickness of preferably, for example, not less than about 2 µm and not greater than about 4 µm.

The dimension in length direction y of multilayer ceramic capacitor 10 is denoted as an L dimension, the dimension in height direction x of multilayer ceramic capacitor 10 including multilayer body 12 and external electrodes 14 and 15 is denoted as a T dimension, and the dimension in width direction z of multilayer ceramic capacitor 10 including multilayer body 12 and external electrodes 14 and 15 is denoted as a W dimension.

The L dimension in length direction y of multilayer ceramic capacitor 10 is preferably, for example, not less than about 0.45 mm and not greater than about 0.75 mm.

The T dimension in height direction x of multilayer ceramic capacitor 10 is preferably, for example, not less than about 70 µm and not greater than about 110 µm.

The W dimension in width direction z of multilayer ceramic capacitor 10 preferably satisfies a condition of about $0.85 \leq W/L \leq$ about 1.0. The T dimension in height direction x is, for example, not less than about 0.04 mm and not greater than about 0.3 mm.

The dimension of multilayer ceramic capacitor 10 can be measured with a microscope.

According to multilayer ceramic capacitor 10 shown in FIG. 1, recess 30 is provided in the surface of first external electrode 14a, second external electrode 14b, third external electrode 15a, and fourth external electrode 15b located on any one of first main surface 12a and second main surface 12b, and thus flatness of the external electrode surface is reduced. Therefore, during visual inspection with an image sensor or the like of a mounter in mounting multilayer ceramic capacitor 10, luminance of light reflected at the surface of multilayer ceramic capacitor 10 can be reduced or prevented. Consequently, halation can be reduced or prevented and the appearance of multilayer ceramic capacitor 10 can be accurately recognized.

In multilayer ceramic capacitor 10 shown in FIG. 1, when the ratio between the area of recess 30 and the area of the external electrode surface is not less than about 1.1% and not higher than about 34.9%, luminance of light reflected at the surface of multilayer ceramic capacitor 10 can be further reduced or prevented. Consequently, halation can be reduced or prevented and the appearance of multilayer ceramic capacitor 10 can be more accurately recognized.

In multilayer ceramic capacitor 10 shown in FIG. 1, when the ratio between the depth of recess 30 and the thickness of third plated layer 48 is not less than about 2.5% and not greater than about 40%, luminance of light reflected at the surface of multilayer ceramic capacitor 10 can be further reduced or prevented. Consequently, halation can be reduced or prevented and the appearance of multilayer ceramic capacitor 10 can be more accurately recognized.

Figure 9A:
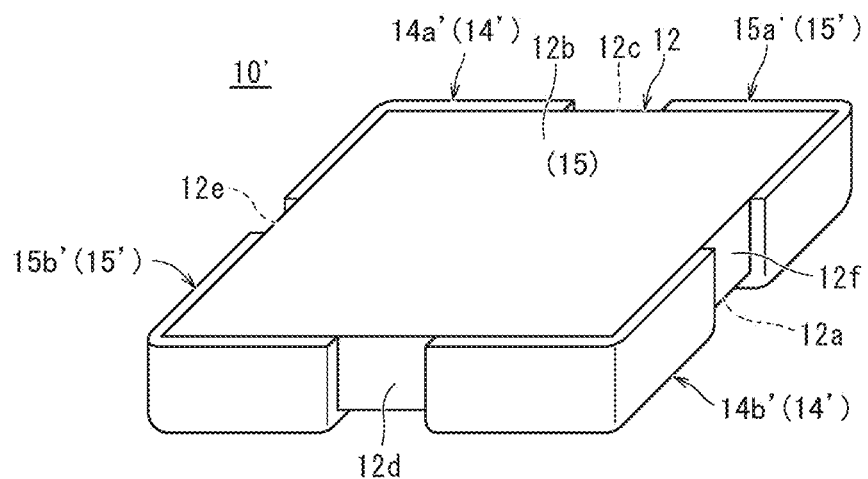
FIG. 9A is a perspective view of a multilayer ceramic capacitor as an example of a multilayer ceramic electronic component according to a modification of the first preferred embodiment of the present invention.
Figure 9B:
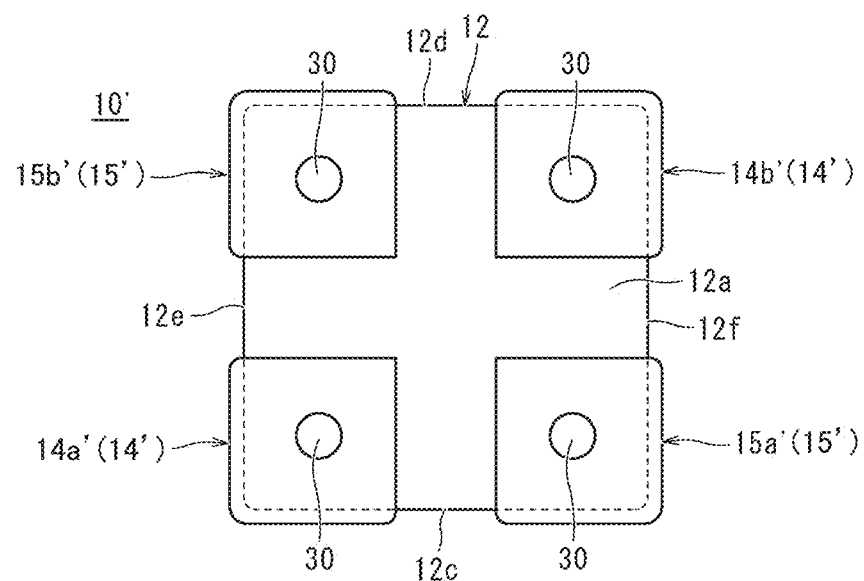
FIG. 9B is a bottom view of the multilayer ceramic capacitor according to the modification of the first preferred embodiment of the present invention.

A multilayer ceramic capacitor according to a modification of the first preferred embodiment of the present invention will now be described. FIG. 9A is a perspective view of the multilayer ceramic capacitor according to the modification of the first preferred embodiment. FIG. 9B is a bottom view of the multilayer ceramic capacitor according to the modification of the first preferred embodiment. In a multilayer ceramic capacitor 10' shown in FIGS. 9A and 9B, elements the same or substantially the same as those in multilayer ceramic capacitor 10 shown in FIGS. 1 to 8B are denoted by the same reference numerals and description thereof will not be repeated.

Multilayer ceramic capacitor 10' according to the modification of the first preferred embodiment is different from multilayer ceramic capacitor 10 in that an external electrode is not provided on second main surface 12b of multilayer body 12.

Multilayer ceramic capacitor 10' includes multilayer body 12 have a parallelepiped shape and external electrodes 14' and 15'.

External electrode 14' includes a first external electrode 14a' electrically connected to first drawn portion 26a of first internal electrode layer 18a and a second external electrode 14b' electrically connected to second drawn portion 26b.

First external electrode 14a' covers first drawn portion 26a on first side surface 12c and third side surface 12e and further covers a portion of first main surface 12a. Second external electrode 14b' covers second drawn portion 26b on second side surface 12d and fourth side surface 12f and further covers a portion of first main surface 12a.

External electrode 15' includes a third external electrode 15a' electrically connected to third drawn portion 28a of second internal electrode layer 18b and a fourth external electrode 15b' electrically connected to fourth drawn portion 28b.

Third external electrode 15a' covers third drawn portion 28a on first side surface 12c and fourth side surface 12f and further covers a portion of first main surface 12a. Fourth external electrode 15b' covers fourth drawn portion 28b on second side surface 12d and third side surface 12e and further covers a portion of first main surface 12a.

Recess 30 is provided in the surface of at least two external electrodes 14' and 15' of first external electrode 14a', second external electrode 14b', third external electrode 15a', and fourth external electrode 15b' located on first main surface 12a. Since flatness of the external electrode surface is thus reduced, during visual inspection with an image sensor or the like of a mounter in mounting multilayer ceramic capacitor 10', luminance of light reflected at the surface of multilayer ceramic capacitor 10' can be reduced or prevented. Consequently, halation can be reduced or prevented and the appearance of multilayer ceramic capacitor 10' can be accurately recognized.

External electrodes 14' and 15' each preferably include underlying electrode layer 40 and plated layer 42 sequentially from the side of multilayer body 12.

Multilayer ceramic capacitor 10' shown in FIGS. 9A and 9B achieves advantageous effects the same as or similar to those of multilayer ceramic capacitor 10 described above and further achieves an advantageous effect described below.

Specifically, since external electrodes 14' and 15' are not provided on the surface of second main surface 12b, in correspondence with the absence of the thickness thereof, the thickness of multilayer body 12 can be increased. Therefore, a strength of multilayer ceramic capacitor 10' and the capacitance per volume can be improved. Since wetting by solder with respect to an upper surface (second main surface 12b) of multilayer ceramic capacitor 10' can be reduced or prevented at the time of mounting, in correspondence therewith, the thickness of multilayer body 12 can be further increased.

The T dimension in height direction x of multilayer ceramic capacitor 10' can be reduced, and consequently, multilayer ceramic capacitor 10' having a further reduced thickness can be obtained.

(2) Method of Manufacturing Multilayer Ceramic Capacitor

A non-limiting example of a method of manufacturing multilayer ceramic capacitors 10 and 10' will now be described.

Initially, a ceramic green sheet and a conductive paste for internal electrodes are prepared. The ceramic green sheet or the conductive paste for the internal electrodes includes a binder (for example, a known organic binder) and a solvent (for example, an organic solvent).

Then, an internal electrode pattern as shown in FIGS. 8A and 8B is formed by printing the conductive paste in a prescribed pattern on the ceramic green sheet, for example, by gravure printing. Specifically, a conductive paste layer is formed by applying a paste including a conductive material onto the ceramic green sheet with a method such as, for example, a gravure method. For example, a paste including metal powders to which an organic binder and an organic solvent are added is used as the paste including the conductive material. A ceramic green sheet for an outer layer including no internal electrode pattern printed thereon is also made.

Then, a multilayer sheet is made from the ceramic green sheets each including the internal electrode pattern formed thereon. Specifically, the multilayer sheet is made by layering the ceramic green sheet including no internal electrode pattern formed thereon, alternately layering thereon the ceramic green sheet including the internal electrode pattern corresponding to first internal electrode layer 18a as shown in FIG. 8A formed thereon and the ceramic green sheet including the internal electrode pattern corresponding to second internal electrode layer 18b as shown in FIG. 8B formed thereon, and further layering the ceramic green sheet including no internal electrode pattern formed thereon.

Furthermore, the multilayer sheet is pressed in the direction of layering by, for example, isostatic pressing to make a multilayer block.

In succession, the multilayer block is cut in a prescribed size to obtain a multilayer chip. A corner and a ridgeline of the multilayer chip may be rounded by barrel polishing.

Then, the multilayer chip is fired to make multilayer body 12 as shown in FIG. 10. A temperature for firing is preferably, for example, not less than about 900° C. and not greater than about 1300° C., although it is dependent on a material for ceramic or the internal electrode.

As shown in FIG. 10, first drawn portion 26a of first internal electrode layer 18a is exposed at first side surface 12c and third side surface 12e of multilayer body 12, and third drawn portion 28a of second internal electrode layer 18b is exposed at first side surface 12c and fourth side surface 12f of multilayer body 12. Second drawn portion 26b of first internal electrode layer 18a is exposed at second side surface 12d and fourth side surface 12f of multilayer body 12 and fourth drawn portion 28b of second internal electrode layer 18b is exposed at second side surface 12d and third side surface 12e of multilayer body 12.

In succession, external electrodes 14 and 15 are formed on multilayer body 12.

Figure 11:
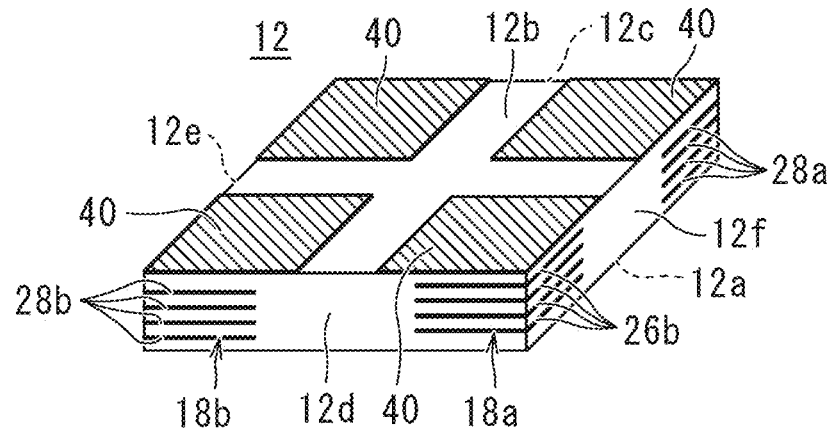
FIG. 11 is a perspective view of the multilayer body shown in FIG. 10 including an underlying electrode layer provided thereon.

Specifically, as shown in FIG. 11, in order to form first plated layer 44 for covering first drawn portion 26a of first internal electrode layer 18a, underlying electrode layer 40 mainly including a Ni/Cu alloy is formed by sputtering on the surface of first main surface 12a and second main surface 12b. In order to form first plated layer 44 for covering third drawn portion 28a of second internal electrode layer 18b as underlying electrode layer 40, underlying electrode layer 40 mainly including a Ni/Cu alloy is formed by sputtering on the surface of first main surface 12a and second main surface 12b. At this time, the underlying electrode layer does not substantially extend to the side surface.

Similarly, in order to form first plated layer 44 for covering second drawn portion 26b of first internal electrode layer 18a, underlying electrode layer 40 mainly including a Ni/Cu alloy is formed by sputtering on the surface of first main surface 12a and second main surface 12b. In order to form first plated layer 44 for covering fourth drawn portion 28b of second internal electrode layer 18b, underlying electrode layer 40 mainly including an Ni/Cu alloy is formed by sputtering on the surface of first main surface 12a and second main surface 12b. At this time, the underlying electrode layer does not substantially extend to the side surface.

Figure 12:
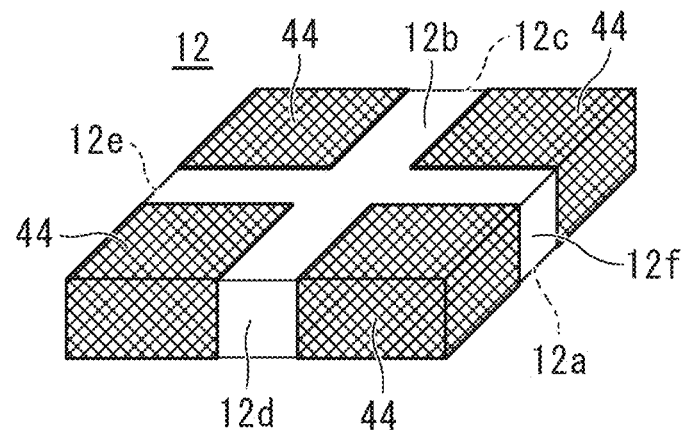
FIG. 12 is a perspective view of the multilayer body including the underlying electrode layer shown in FIG. 11, on which a first plated layer is provided.

In succession, as shown in FIG. 12, first plated layer 44 is formed by Cu plating to be continuous to a surface of a portion of first side surface 12c and third side surface 12e and a surface of a portion of first main surface 12a and second main surface 12b to cover first drawn portion 26a of first internal electrode layer 18a exposed at first side surface 12c and third side surface 12e of multilayer body 12 and underlying electrode layer 40. First plated layer 44 is formed by Cu plating to be continuous to a surface of a portion of first side surface 12c and fourth side surface 12f and a surface of a portion of first main surface 12a and second main surface 12b to cover third drawn portion 28a of second internal electrode layer 18b exposed at first side surface 12c and fourth side surface 12f of multilayer body 12.

Similarly, first plated layer 44 is formed by Cu plating to be continuous to a surface of a portion of second side surface 12d and fourth side surface 12f and a surface of a portion of first main surface 12a and second main surface 12b to cover second drawn portion 26b of first internal electrode layer 18a exposed at second side surface 12d and fourth side surface 12f of multilayer body 12. First plated layer 44 is formed by Cu plating to be continuous to a surface of a portion of second side surface 12d and third side surface 12e and a surface of a portion of first main surface 12a and second main surface 12b to cover fourth drawn portion 28b of second internal electrode layer 18b exposed at second side surface 12d and third side surface 12e of multilayer body 12.

In forming external electrodes 14' and 15' but not on second main surface 12b as in multilayer ceramic capacitor 10', underlying electrode layer 40 is not formed on second main surface 12b.

Then, second plated layer 46 is formed to cover the surface of first plated layer 44. For example, an Ni plated layer is formed as second plated layer 46.

Furthermore, third plated layer 48 is formed to cover the surface of second plated layer 46. For example, an Sn plated layer is formed as third plated layer 48.

In succession, recess 30 is formed in the surface of external electrodes 14 and 15 located on first main surface 12a or second main surface 12b.

In providing recess 30, recess 30 is provided by pressing a rod that is made of a metal and is capable of cutting, against a portion where recess 30 is desired in the surface of external electrodes 14 and 15. By changing a diameter of the metal rod or a depth of pressing, the depth, the diameter, and the area of recess 30 can be changed and adjusted.

Multilayer ceramic capacitor 10 as shown in FIG. 1 or multilayer ceramic capacitor 10' as shown in FIGS. 9A and 9B is manufactured as set forth above.

2. Second Preferred Embodiment

A multilayer ceramic capacitor as an example of a multilayer ceramic component according to a second preferred embodiment of the present invention will be described below.

Figure 13:
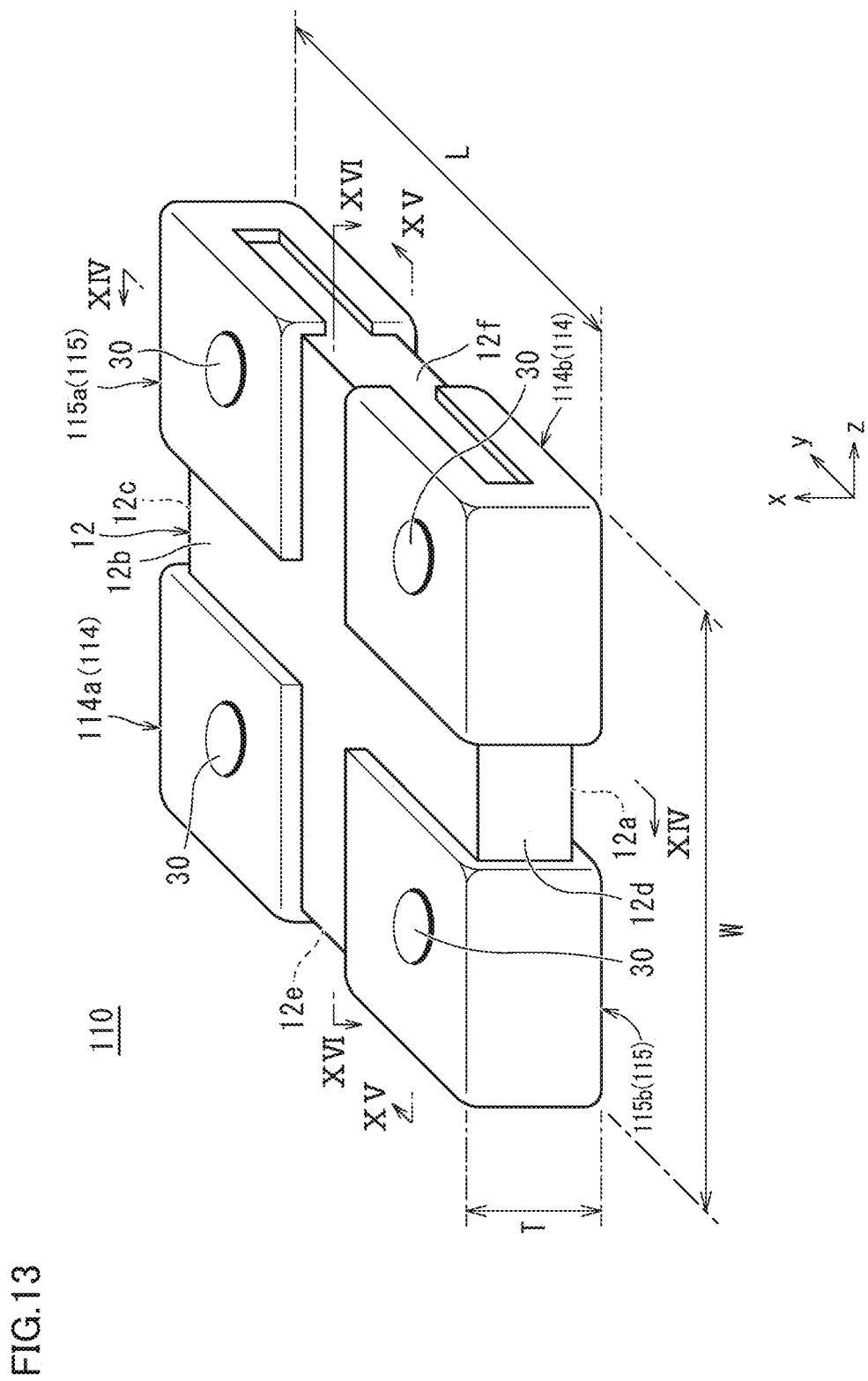
FIG. 13 is a perspective view of a multilayer ceramic capacitor as an example of a multilayer ceramic electronic component according to a second preferred embodiment of the present invention.
Figure 14:
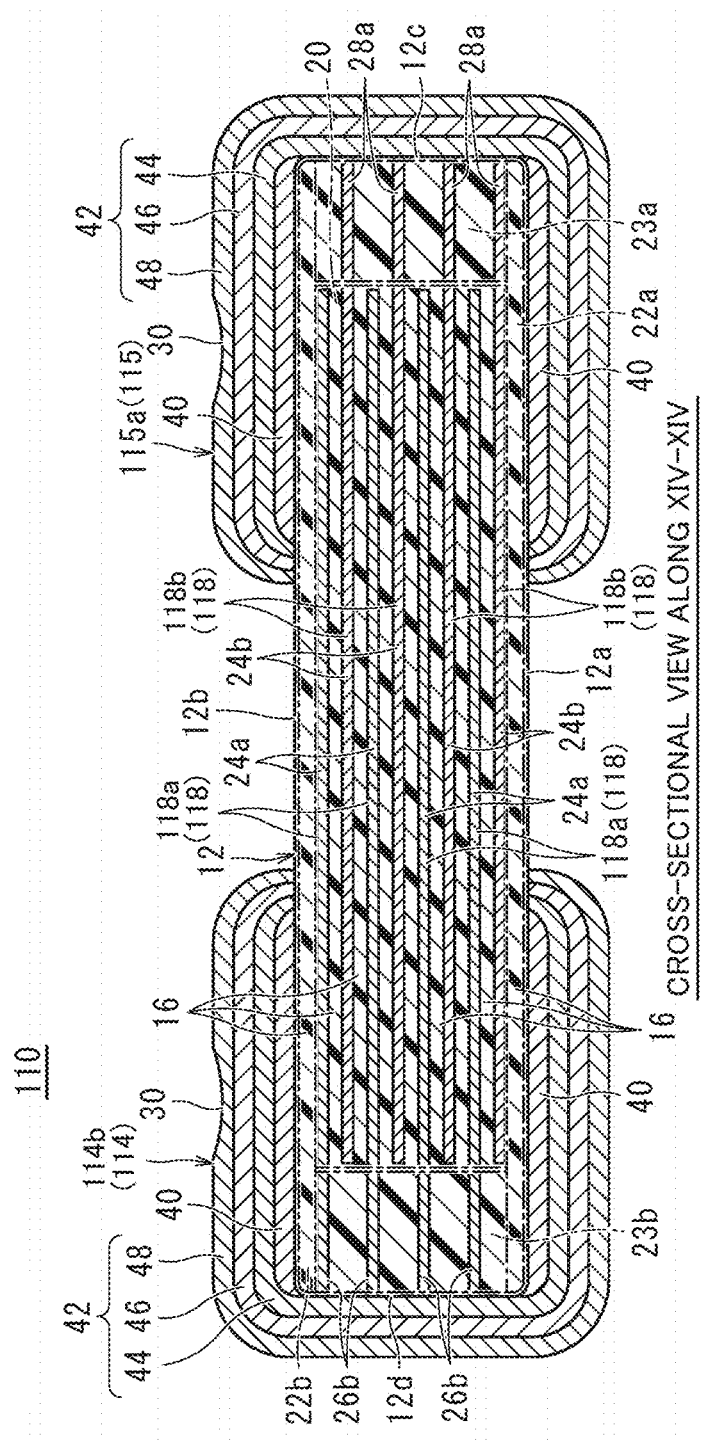
FIG. 14 is a cross-sectional view along the line XIV-XIV of the multilayer ceramic capacitor shown in FIG. 13.
Figure 15:
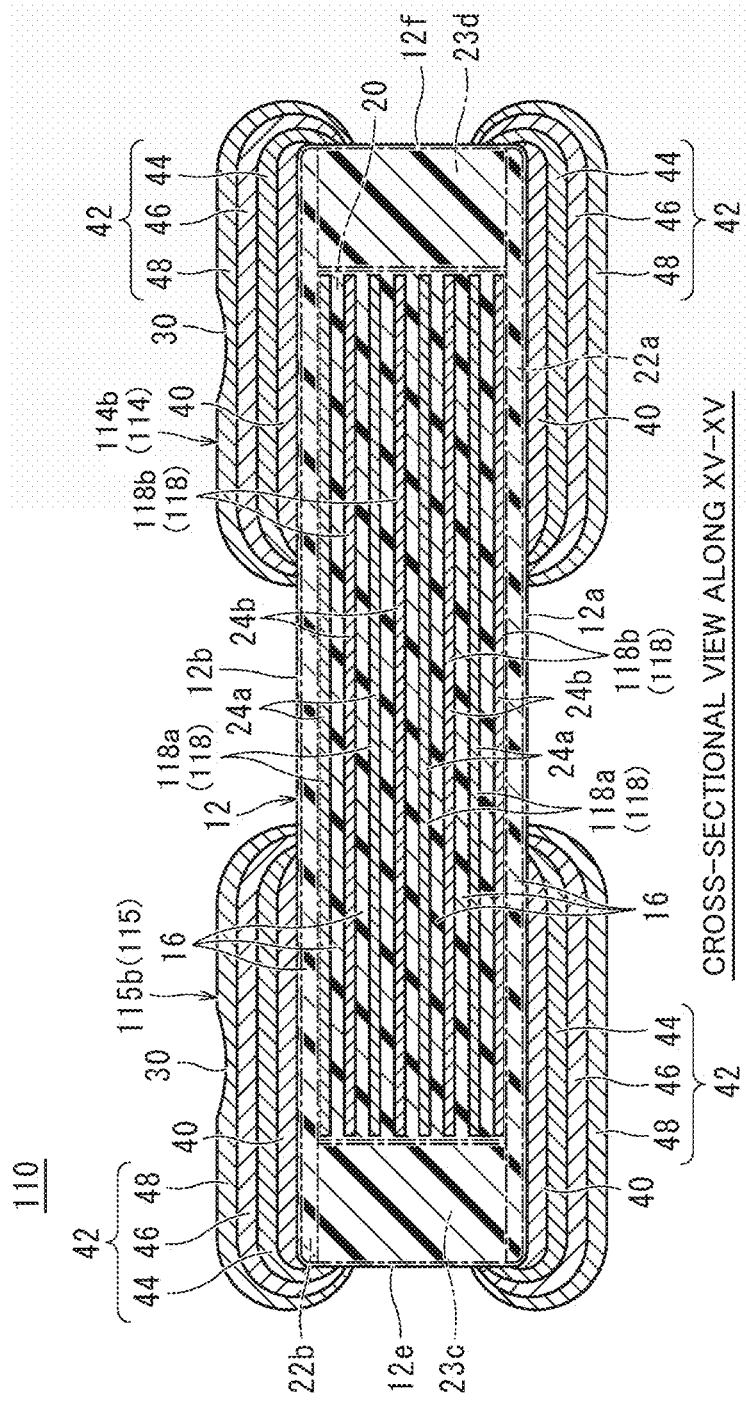
FIG. 15 is a cross-sectional view along the line XV-XV of the multilayer ceramic capacitor shown in FIG. 13.
Figure 16:
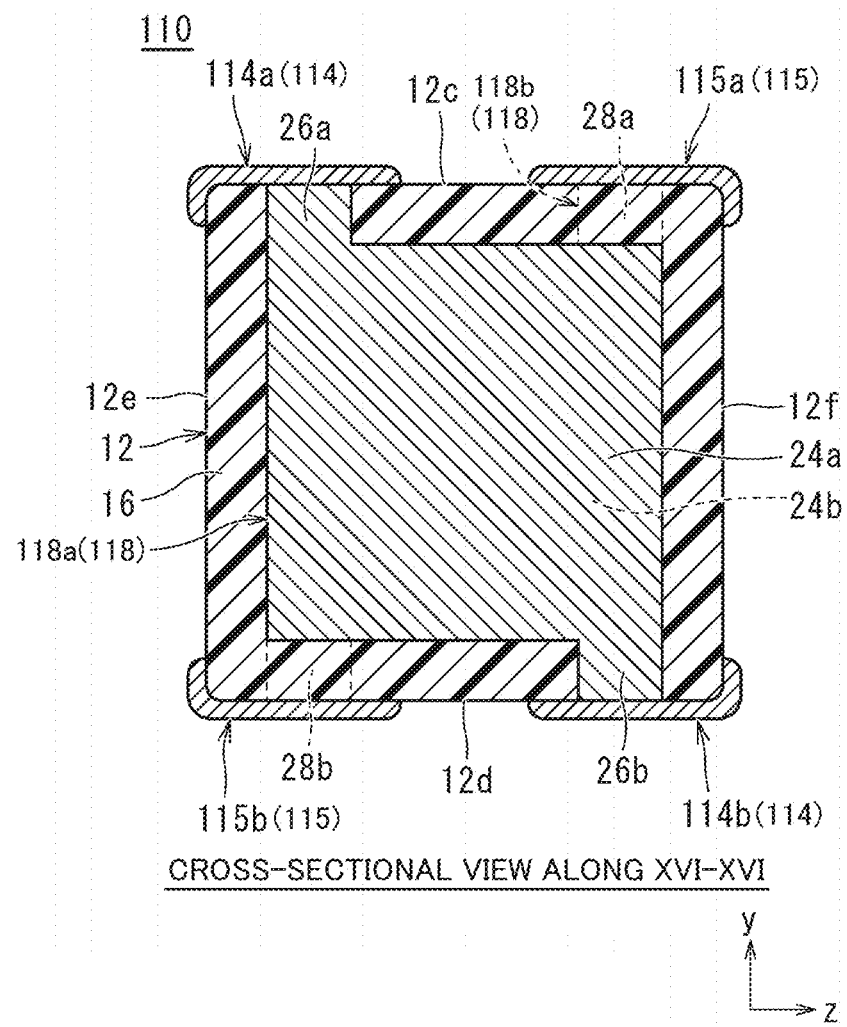
FIG. 16 is a cross-sectional view along the line XVI-XVI of the multilayer ceramic capacitor shown in FIG. 13.
Figure 17:
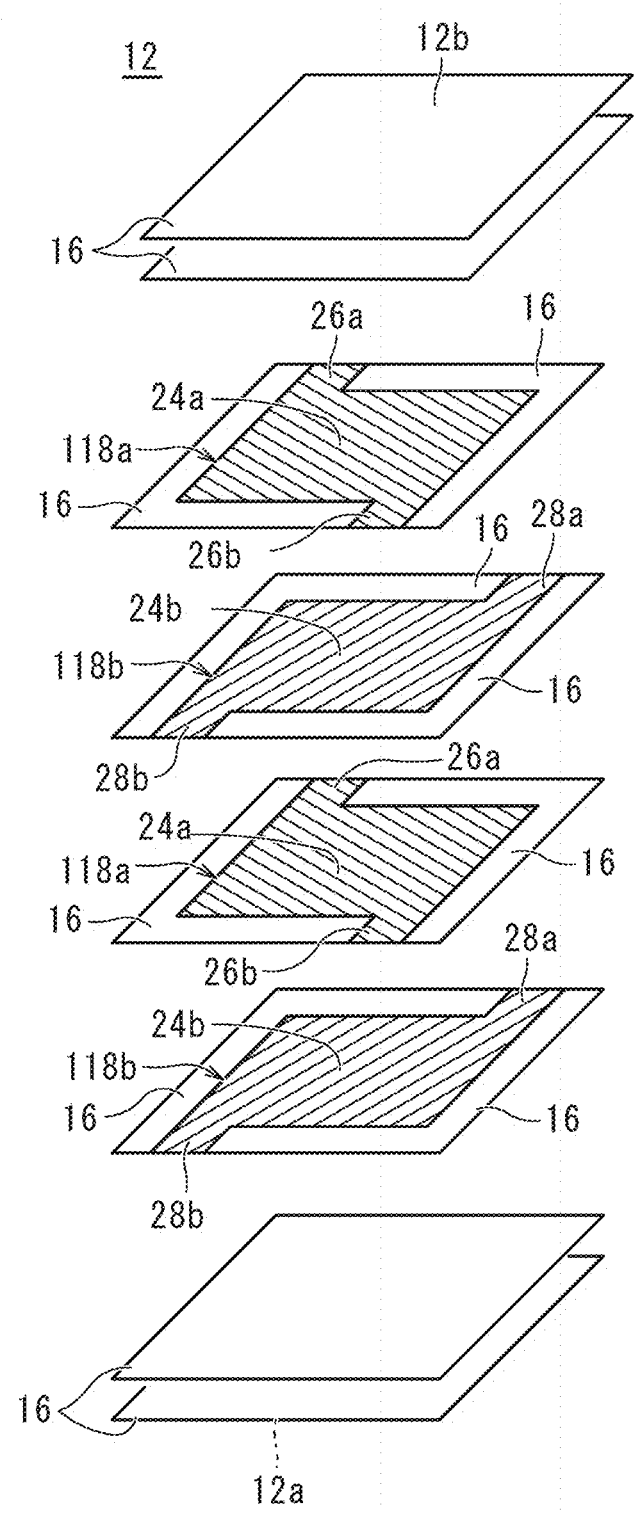
FIG. 17 is an exploded perspective view of a multilayer body shown in FIGS. 13 to 16.

FIG. 13 is a perspective view of the multilayer ceramic capacitor in the second preferred embodiment. FIG. 14 is a cross-sectional view along the line XIV-XIV of the multilayer ceramic capacitor shown in FIG. 13. FIG. 15 is a cross-sectional view along the line XV-XV of the multilayer ceramic capacitor shown in FIG. 13. FIG. 16 is a cross-sectional view along the line XVI-XVI of the multilayer ceramic capacitor shown in FIG. 13. FIG. 17 is an exploded perspective view of a multilayer body shown in FIGS. 13 to 16. FIG. 18A is a diagram showing a pattern of a first internal electrode layer of the multilayer ceramic capacitor shown in FIG. 13. FIG. 18B is a diagram showing a pattern of a second internal electrode layer of the multilayer ceramic capacitor shown in FIG. 13. Elements of a multilayer ceramic capacitor 110 shown in FIGS. 13 to 18B that are the same or substantially the same as those of multilayer ceramic capacitor 10 shown in FIGS. 1 to 5 are denoted by the same reference numerals and description thereof will not be repeated.

Multilayer ceramic capacitor 110 includes multilayer body 12 having a parallelepiped shape and external electrodes 114 and 115.

Multilayer body 12 includes a plurality of ceramic layers 16 and a plurality of internal electrode layers 118.

In multilayer ceramic capacitor 110, as shown in FIGS. 14 to 16, in multilayer body 12, internal electrode layers 118 are alternately layered with ceramic layer 16 being interposed therebetween.

Multilayer body 12 includes a plurality of first internal electrode layers 118a and a plurality of second internal electrode layers 118b as the plurality of internal electrode layers 118. First internal electrode layer 118a and second internal electrode layer 118b are alternately layered with ceramic layer 16 being interposed therebetween.

First internal electrode layer 118a is provided on a surface of ceramic layer 16. First internal electrode layer 118a includes first opposing portion 24a opposed to first main surface 12a and second main surface 12b and is layered in the direction of connection between first main surface 12a and second main surface 12b.

Second internal electrode layer 118b is provided on a surface of ceramic layer 16 different from ceramic layer 16 on which first internal electrode layer 118a is provided. Second internal electrode layer 118b includes second opposing portion 24b opposed to first main surface 12a and second main surface 12b and is layered in the direction of connection between first main surface 12a and second main surface 12b.

First internal electrode layer 118a extends to first side surface 12c of multilayer body 12 by first drawn portion 26a and extends to second side surface 12d of multilayer body 12 by second drawn portion 26b. First drawn portion 26a extends toward third side surface 12e of multilayer body 12 and second drawn portion 26b extends toward fourth side surface 12f of multilayer body 12.

Second internal electrode layer 118b extends to first side surface 12c of multilayer body 12 by third drawn portion 28a and extends to second side surface 12d of multilayer body 12 by fourth drawn portion 28b. Third drawn portion 28a extends toward fourth side surface 12f of multilayer body 12 and fourth drawn portion 28b extends toward third side surface 12c of multilayer body 12.

First internal electrode layer 118a and second internal electrode layer 118b are not exposed at third side surface 12e and fourth side surface 12f of multilayer body 12.

First drawn portion 26a of first internal electrode layer 118a may extend to one of first side surface 12c, second side surface 12d, third side surface 12e, and fourth side surface 12f, and in that case, second drawn portion 26b of first internal electrode layer 118a may extend to one side surface other than the side surface where first drawn portion 26a is drawn.

Third drawn portion 28a of second internal electrode layer 118b may extend to one of first side surface 12c, second side surface 12d, third side surface 12e, and fourth side surface 12f, and fourth drawn portion 28b of second internal electrode layer 118b may extend to one surface other than the side surface where third drawn portion 28a is drawn.

When multilayer ceramic capacitor 110 is viewed in height direction x, a straight line that connects first drawn portion 26a and second drawn portion 26b of first internal electrode layer 118a to each other preferably intersects with a straight line that connects third drawn portion 28a and fourth drawn portion 28b of second internal electrode layer 118b to each other.

Furthermore, in side surfaces 12c, 12d, 12e, and 12f of multilayer body 12, preferably, first drawn portion 26a of first internal electrode layer 118a and fourth drawn portion 28b of second internal electrode layer 118b extend to positions opposed to each other, and second drawn portion 26b of first internal electrode layer 118a and third drawn portion 28a of second internal electrode layer 18b extend to positions opposed to each other.

External electrodes 114 and 115 are provided on first main surface 12a, second main surface 12b, first side surface 12c, and second side surface 12d of multilayer body 12.

External electrode 114 includes a first external electrode 114a electrically connected to first drawn portion 26a of first internal electrode layer 118a and a second external electrode 114b electrically connected to second drawn portion 26b.

First external electrode 114a covers first drawn portion 26a on first side surface 12c and covers a portion of first main surface 12a, second main surface 12b, and third side surface 12e. Second external electrode 114b covers second drawn portion 26b on second side surface 12d and covers a portion of first main surface 12a, second main surface 12b, and fourth side surface 12f.

External electrode 115 includes a third external electrode 115a electrically connected to third drawn portion 28a of second internal electrode layer 118b and a fourth external electrode 115b electrically connected to fourth drawn portion 28b.

Third external electrode 115a covers third drawn portion 28a on first side surface 12c and covers a portion of first main surface 12a, second main surface 12b, and fourth side surface 12f. Fourth external electrode 115b covers fourth drawn portion 28b on second side surface 12d and covers a portion of first main surface 12a, second main surface 12b, and third side surface 12e.

Furthermore, as shown in FIG. 13, external electrodes 114 and 115 on third side surface 12e or fourth side surface 12f where internal electrode layer 118 does not extend preferably cover in a bracket shape, any one short side of the side surface where internal electrode layer 118 does not extend and a portion from ends of the short side to portions intermediate between opposing long sides.

In multilayer body 12, first opposing portion 24a and second opposing portion 24b are opposed to each other with ceramic layer 16 being interposed therebetween, so that an electrical characteristic (for example, a capacitance) is provided. Therefore, the capacitance can be obtained between first external electrode 114a and second external electrode 114b to which first internal electrode layer 118a is connected and third external electrode 115a and fourth external electrode 115b to which second internal electrode layer 118b is connected. Therefore, multilayer ceramic capacitor 110 defines and functions as a capacitor.

Recess 30 is provided in a surface of at least two external electrodes 114 and 115 of first external electrode 114a, second external electrode 114b, third external electrode 115a, and fourth external electrode 115b located on any one of first main surface 12a and second main surface 12b. Since flatness of the external electrode surface is thus reduced, during visual inspection with an image sensor or the like of a mounter in mounting multilayer ceramic capacitor 110, luminance of light reflected at the surface of multilayer ceramic capacitor 110 can be reduced or prevented. Consequently, halation can be reduced or prevented and the appearance of multilayer ceramic capacitor 110 can be accurately recognized.

External electrodes 114 and 115 each preferably include underlying electrode layer 40 and plated layer 42 sequentially from the side of multilayer body 12.

Multilayer ceramic capacitor 110 shown in FIG. 13 achieves advantageous effects the same as or similar to those of multilayer ceramic capacitor 10 according to the first preferred embodiment.

(1) Method of Manufacturing Multilayer Ceramic Electronic Component

A non-limiting example of a method of manufacturing multilayer ceramic capacitor 110 as the multilayer ceramic electronic component will now be described.

Initially, a ceramic green sheet and a conductive paste for internal electrodes are prepared. The ceramic green sheet or the conductive paste for the internal electrodes includes a binder (for example, a known organic binder) and a solvent (for example, an organic solvent).

Then, an internal electrode pattern as shown in FIGS. 18A and 18B is formed by printing the conductive paste in a prescribed pattern on the ceramic green sheet, for example, by gravure printing. Specifically, a conductive paste layer is formed by applying a paste including a conductive material onto the ceramic green sheet with a method such as gravure printing, for example. For example, a paste including metal powders to which an organic binder and an organic solvent are added is used as the paste including the conductive material. A ceramic green sheet for an outer layer including no internal electrode pattern printed thereon is also made.

A multilayer sheet is made from the ceramic green sheets each including the internal electrode pattern formed thereon. Specifically, the multilayer sheet is made by layering the ceramic green sheet including no internal electrode pattern formed thereon, alternately layering thereon the ceramic green sheet including the internal electrode pattern corresponding to first internal electrode layer 118a as shown in FIG. 18A formed thereon and the ceramic green sheet including the internal electrode pattern corresponding to second internal electrode layer 118b as shown in FIG. 18B formed thereon, and further layering the ceramic green sheet including no internal electrode pattern formed thereon.

Furthermore, the multilayer sheet is pressed in the direction of layering by, for example, isostatic pressing to make a multilayer block.

Then, the multilayer block is cut in a prescribed size to obtain a multilayer chip. A corner and a ridgeline of the multilayer chip may be rounded by barrel polishing.

Figure 19:
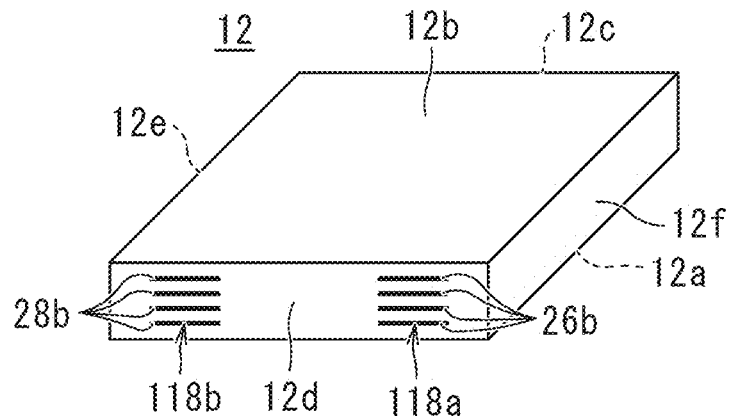
FIG. 19 is a perspective view of the multilayer body of the multilayer ceramic capacitor in FIG. 13.

Then, the multilayer chip is fired to make multilayer body 12 as shown in FIG. 19. A temperature for firing is preferably, for example, not less than about 900° C. and not greater than about 1300° C., although it is dependent on a material for ceramic or the internal electrode.

Figure 20:
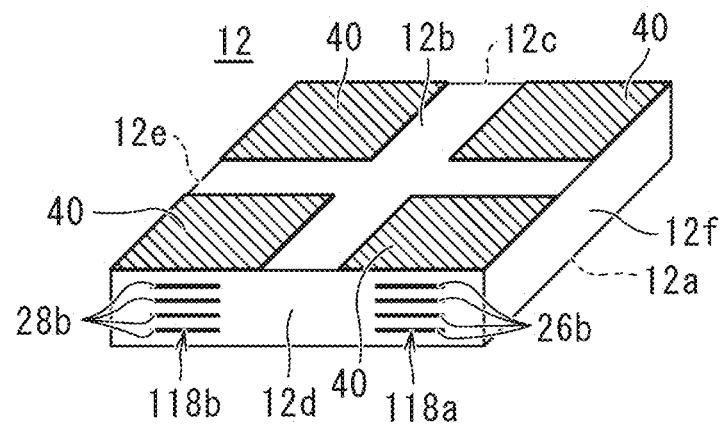
FIG. 20 is a perspective view of the multilayer body shown in FIG. 19 including an underlying electrode layer provided thereon.
Figure 21:
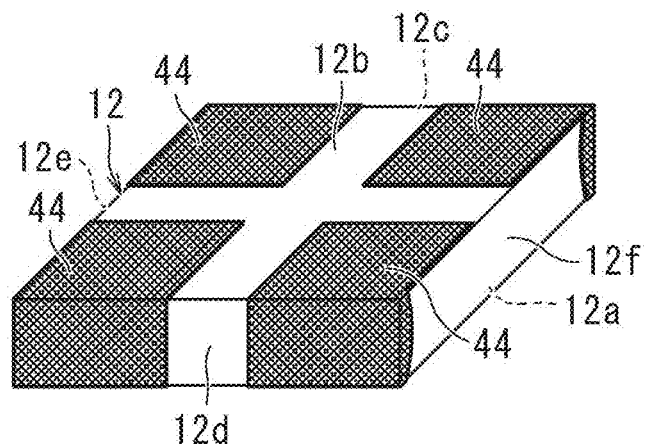
FIG. 21 is a perspective view of the multilayer body including the underlying electrode layer shown in FIG. 20, on which a first plated layer is provided.

As shown in FIG. 20, first drawn portion 26a of first internal electrode layer 118a and third drawn portion 28a of second internal electrode layer 118b are exposed at first side surface 12c of multilayer body 12. Second drawn portion 26b of first internal electrode layer 118a and fourth drawn portion 28b of second internal electrode layer 118b are exposed at second side surface 12d of multilayer body 12.

In succession, external electrodes 114 and 115 are formed on multilayer body 12.

Specifically, in order to form first plated layer 44 for covering first drawn portion 26a of first internal electrode layer 118a, underlying electrode layer 40 mainly including a Ni/Cu alloy is formed by sputtering on the surface of first main surface 12a and second main surface 12b. In order to form first plated layer 44 for covering third drawn portion 28a of second internal electrode layer 118b, underlying electrode layer 40 mainly including a Ni/Cu alloy is formed by sputtering on the surface of first main surface 12a and second main surface 12b. At this time, the underlying electrode layer does not substantially extend to the side surface.

Similarly, in order to form first plated layer 44 for covering second drawn portion 26b of first internal electrode layer 118a, underlying electrode layer 40 mainly including a Ni/Cu alloy is formed by sputtering on the surface of first main surface 12a and second main surface 12b. In order to form first plated layer 44 for covering fourth drawn portion 28b of second internal electrode layer 118b, underlying electrode layer 40 mainly including a Ni/Cu alloy is formed by sputtering on the surface of first main surface 12a and second main surface 12b. At this time, the underlying electrode layer does not substantially extend to the side surface.

In succession, first plated layer 44 is formed by Cu plating to continuous to a surface of a portion of first side surface 12c and a surface of a portion of first main surface 12a and a portion of second main surface 12b to cover first drawn portion 26a of first internal electrode layer 118a exposed at first side surface 12c of multilayer body 12 and underlying electrode layer 40.

First plated layer 44 is formed by Cu plating to be continuous to a surface of a portion of second side surface 12d and a surface of a portion of first main surface 12a and a portion of second main surface 12b to cover second drawn portion 26b of first internal electrode layer 118a exposed at second side surface 12d of multilayer body 12.

Similarly, first plated layer 44 is formed by Cu plating to be continuous to a surface of a portion of first side surface 12c and a surface of a portion of first main surface 12a and a portion of second main surface 12b to cover third drawn portion 28a of second internal electrode layer 118b exposed at first side surface 12c of multilayer body 12.

First plated layer 44 is formed by Cu plating to be continuous to a surface of a portion of second side surface 12d and a surface of a portion of first main surface 12a and a portion of second main surface 12b to cover fourth drawn portion 28b of second internal electrode layer 118b exposed at second side surface 12d of multilayer body 12.

Then, second plated layer 46 is formed to cover the surface of first plated layer 44. A Ni plated layer, for example, is formed as second plated layer 46.

Furthermore, third plated layer 48 is formed to cover the surface of second plated layer 46. A Sn plated layer, for example, is formed as third plated layer 48.

Then, with plated layer 42, external electrodes 114 and 115 arranged on the side surface where internal electrode layer 118 does not extend is formed in a bracket shape to cover opposing short sides of the side surface where internal electrode layer 118 does not extend and portions from the ends of the opposing short sides to portions intermediate between opposing long sides.

Thereafter, recess 30 is provided in the surface of external electrodes 114 and 115 with a method the same as or similar to that for multilayer ceramic capacitor 10 in the first preferred embodiment.

Multilayer ceramic capacitor 110 as shown in FIG. 13 is manufactured as set forth above.

3. Experimental Example

Advantageous effects of the multilayer ceramic capacitor obtained as set forth above will become apparent from experimental examples below.

A multilayer ceramic capacitor having the structure shown in FIGS. 1 to 6 was made in accordance with the non-limiting example of a manufacturing method as the multilayer ceramic electronic component according to a preferred embodiment of the present invention described above, and whether or not halation occurred during a mounter was checked and a state of the recess was visually inspected.

(1) Specifications in Examples

In Examples of a preferred embodiment of the present invention, samples of the multilayer ceramic capacitors in Examples 1 to 21 with specifications as described below were made in accordance with the non-limiting example of a method of manufacturing the multilayer ceramic capacitor described in the first preferred embodiment above.

Specifications common to the multilayer ceramic capacitors in Examples are as below.
Specifications of samples
Dimension of multilayer ceramic capacitor: see Tables 1 and 2
Material for ceramic layer: $BaTiO_3$
Capacitance: about 220 nF
Rated voltage: about 4 V
Internal electrode layer
Pattern of internal electrode layer: see FIGS. 8A and 8B
Material for internal electrode: Ni
Structure of external electrode
Underlying electrode layer
Composed of underlying electrode layer, first plated layer, second plated layer, and third plated layer
Underlying electrode layer: thin electrode (sputtered electrode) formed by sputtering
Material for underlying electrode layer: alloy containing Ni, Cr, and Cu
Thickness of underlying electrode layer: about 200 nm
Plated layer
Material for first plated layer: Cu
Thickness of first plated layer: about 5 μm
Material for second plated layer: Ni
Thickness of second plated layer: about 3 μm
Material for third plated layer: Sn
Thickness of third plated layer: about 3 μm
Structure of recess
Position where recess is provided: provided in center of external electrode
Area of recess: see Tables 1 and 2
Depth of recess: see Tables 1 and 2

(2) Specifications in Comparative Example

Samples of the multilayer ceramic capacitors in which no recess was provided in the external electrode were made as Comparative Example.

The multilayer ceramic capacitors in Comparative Example were made in accordance with the method of manufacturing the multilayer ceramic capacitor described in the first preferred embodiment. The material for the ceramic layer, the material for the internal electrode, or otherwise is in common to Examples.

Table 1 shows specifications of the multilayer ceramic capacitors in Comparative Example.

(3) Method of Measuring and Calculating Each Dimension (a) Method of Measuring Dimension in Length Direction of External
Electrode Surface In measuring a dimension in the length direction of the external electrode surface in each sample, a dimension in the length direction of any of the first to fourth external electrodes formed on the first main surface or the second main surface was measured with a microscope.

(b) Method of Measuring Dimension in Width Direction of External Electrode Surface In measuring a dimension in the width direction of the external electrode in each sample, a dimension in the width direction of any of the first to fourth external electrodes formed on the first main surface or the second main surface was measured with a microscope.

(c) Method of Calculating Area of External Electrode Surface

An area of the external electrode surface was calculated from the dimension in the length direction of the external electrode surface and the dimension in the width direction of the external electrode surface measured with the method described above.

(d) Method of Calculating Diameter of Recess

A diameter of the recess in the external electrode surface was measured with a method below.

Specifically, initially, in the LW plane of the multilayer ceramic capacitor, with the surface of the external electrode including an indentation facing up, the profile in the height direction of the entire multilayer ceramic capacitor was measured with a laser displacement gauge.

Thereafter, maximum lengths in length direction y and width direction z of the recess were measured and an average value thereof was defined as the diameter of the recess. The recess is assumed to start from a portion where the height continuously decreases on the profile and ends at a portion where the height returns to the height of the planar portion.

(e) Method of Calculating Area of Recess

In calculating an area of the recess in the external electrode surface, in the LW plane of the multilayer ceramic capacitor representing the sample, with the surface of the external electrode including the recess facing up, the profile in the height direction of the entire multilayer ceramic capacitor was measured with a laser displacement gauge.

Thereafter, maximum lengths in length direction y and width direction z of the recess were measured and the area of the recess was calculated by multiplying the maximum lengths by each other. The recess is assumed to start from a portion where the height continuously decreases on the profile and ends at a portion where the height returns to the height of the planar portion.

(f) Method of Calculating Ratio Between Area of Recess and Area of External Electrode Surface A ratio between the area of the recess and the area of the external electrode surface was calculated from the area of the recess and the area of the external electrode surface calculated with the method described above. Specifically, the ratio between the area of the recess and the area of the external electrode surface was calculated as the ratio=(area of recess)/(area of external electrode surface).

(g) Method of Measuring Thickness of Third Plated Layer and Depth of Recess

In measuring the thickness of the third plated layer, the multilayer ceramic capacitor representing the sample was polished from any of the first to fourth side surfaces as being substantially in parallel to the polished side surface to expose, for example, a cross-section (LT cross-section) as shown in FIG. 4. A value of the thickness of the third plated layer measured with a microscope in the exposed cross-section along the height direction in which the first main surface and the second main surface were connected to each other was defined as the thickness of the third plated layer.

In measuring the depth of the recess, a value of the length of the normal from the reference line along the outermost surface of the external electrode to the lowest point of the recess was measured with a microscope in the LT cross-section exposed with the method described above, and this value was defined as the depth of the recess. A cross-section (LT cross-section) at a position about ½ the length in length direction y or width direction z of recess 30 was exposed.

(h) Method of Calculating Ratio Between Depth of Recess and Thickness of Third Plated Layer A ratio between the depth of the recess and the thickness of the third plated layer was calculated from the value of the depth of the recess and the value of the thickness of the third plated layer measured with the method described above. Specifically, the ratio between the thickness of the third plated layer and the depth of the recess was calculated as the ratio=(value of depth of recess)/(value of thickness of third plated layer).

(4) Method of Checking Whether or Not Halation Occurred in Mounter

A reel in which a multilayer ceramic capacitor representing the sample had been tape-packaged was prepared. An error in recognition of the sample that occurred in taking the multilayer ceramic capacitor out of the reel by using the mounter was regarded as occurrence of halation, and it was counted as the number of times of occurrence of halation. In each of Examples and Comparative Example, the number of samples was set to one thousand.

(5) Method of Checking State of Recess by Visual Inspection

With the external electrode surface of the multilayer ceramic capacitor representing the sample including the recess facing up, this upper surface was observed with a microscope at a 20-fold magnification. A state that substantially no recess was observed in the external electrode surface and a state that the recess occupied approximately more than 30% of the external electrode surface were determined as poor appearance. In each of Examples and Comparative Example, the number of samples was set to one thousand.

Tables 1 and 2 show results of experiments for each of Examples and Comparative Example above.

TABLE 1

| Item | Comparative Example | Example 1 | Example 2 | Example 3 | Example 4 | Example 5 | Example 6 |
|---|---|---|---|---|---|---|---|
| L Dimension of External Electrode Surface (µm) | 200 | 200 | 150 | 250 | 250 | 150 | 250 |
| W Dimension of External Electrode Surface (µm) | 200 | 200 | 150 | 250 | 250 | 150 | 250 |
| Area of External Electrode Surface (µm$^2$) | 40000 | 40000 | 22500 | 62500 | 62500 | 22500 | 62500 |
| Thickness of Third Plated Layer (µm) | 3.2 | 3.2 | 2.5 | 4 | 4 | 2.5 | 4 |
| Diameter of Recess (µm) | — | 70 | 70 | 70 | 30 | 100 | 100 |
| Area of Recess (µm$^2$) | — | 3,848 | 3,848 | 3,848 | 707 | 7,854 | 7,854 |
| Depth of Recess (µm) | — | 0.5 | 0.5 | 0.5 | 0.5 | 0.5 | 0.1 |
| Area of Recess/Area of External Electrode | — | 9.6% | 17.1% | 6.2% | 1.1% | 34.9% | 12.6% |
| Depth of Recess/Thickness of Third Sn Plated Layer | — | 15.6% | 20.0% | 12.5% | 12.5% | 20.0% | 2.5% |
| Occurrence of Halation (Count) | 752/1000 | 0/1000 | 0/1000 | 0/1000 | 2/1000 | 0/1000 | 0/1000 |
| Checked State of Recess by Visual Inspection (Count) | 0/1000 | 0/1000 | 0/1000 | 0/1000 | 0/1000 | 0/1000 | 0/1000 |

| Item | Example 7 | Example 8 | Example 9 | Example 10 | Example 11 | Example 12 |
|---|---|---|---|---|---|---|
| L Dimension of External Electrode Surface (µm) | 150 | 200 | 250 | 200 | 150 | 200 |
| W Dimension of External Electrode Surface (µm) | 150 | 200 | 250 | 200 | 150 | 200 |

TABLE 1-continued

| Item | | | | | | |
|---|---|---|---|---|---|---|
| Area of External Electrode Surface (μm²) | 22500 | 40000 | 62500 | 40000 | 22500 | 40000 |
| Thickness of Third Plated Layer (μm) | 2.5 | 3.2 | 3.2 | 3.2 | 2.5 | 3.2 |
| Diameter of Recess (μm) | 100 | 20 | 20 | 110 | 110 | 150 |
| Area of Recess (μm²) | 7,854 | 314 | 314 | 9,503 | 9,503 | 17,671 |
| Depth of Recess (μm) | 1 | 0.5 | 0.5 | 0.5 | 0.5 | 0.5 |
| Area of Recess/Area of External Electrode | 34.9% | 0.8% | 0.5% | 23.8% | 42.2% | 44.2% |
| Depth of Recess/Thickness of Third Sn Plated Layer | 40.0% | 15.6% | 15.6% | 15.6% | 20.0% | 15.6% |
| Occurrence of Halation (Count) | 0/1000 | 57/1000 | 180/1000 | 0/1000 | 0/1000 | 0/1000 |
| Checked State of Recess by Visual Inspection (Count) | 0/1000 | 0/1000 | 0/1000 | 0/1000 | 10/1000 | 45/1000 |

TABLE 2

| Item | Example 13 | Example 14 | Example 15 | Example 16 | Example 17 | Example 18 | Example 19 | Example 20 | Example 21 |
|---|---|---|---|---|---|---|---|---|---|
| L Dimension of External Electrode Surface (μm) | 200 | 150 | 250 | 150 | 250 | 250 | 150 | 250 | 150 |
| W Dimension of External Electrode Surface (μm) | 200 | 150 | 250 | 150 | 250 | 250 | 150 | 250 | 150 |
| Area of External Electrode Surface (μm²) | 40000 | 22500 | 62500 | 22500 | 62500 | 62500 | 22500 | 62500 | 22500 |
| Thickness of Third Plated Layer (μm) | 3.2 | 2.5 | 4 | 2.5 | 4 | 4 | 2.5 | 4 | 2.5 |
| Diameter of Recess (μm) | 70 | 70 | 70 | 70 | 70 | 70 | 70 | 70 | 70 |
| Area of Recess (μm²) | 3,848 | 3,848 | 3,848 | 3,848 | 3,848 | 3,848 | 3,848 | 3,848 | 3,848 |
| Depth of Recess (μm) | 0.5 | 0.5 | 0.5 | 1 | 0.1 | 0.05 | 0.05 | 1.5 | 1.5 |
| Area of Recess/Area of External Electrode | 9.6% | 17.1% | 6.2% | 17.1% | 6.2% | 6.2% | 17.1% | 6.2% | 17.1% |
| Depth of Recess/Thickness of Third Sn Plated Layer | 15.6% | 20.0% | 12.5% | 40.0% | 2.5% | 1.3% | 2.0% | 37.5% | 60.0% |
| Occurrence of Halation (Count) | 0/1000 | 0/1000 | 0/1000 | 0/1000 | 0/1000 | 160/1000 | 290/1000 | 0/1000 | 0/1000 |
| Checked State of Recess by Visual Inspection (Count) | 0/1000 | 0/1000 | 0/1000 | 3/1000 | 0/1000 | 0/1000 | 0/1000 | 0/1000 | 120/1000 |

In Tables 1 and 2, in the multilayer ceramic capacitors representing the samples in Examples 1 to 21, the recess was provided in the surface of the external electrode. Therefore, the occurrence of halation was relatively less often and the state of the recess provided in the external electrode surface was also relatively good.

In Examples 8 and 9, the ratio between the area of the recess and the area of the external electrode surface was equal to or less than about 1.1%. Therefore, in Example 8, halation occurred in fifty-seven multilayer ceramic capacitors among one thousand multilayer ceramic capacitors, and in Example 9, halation occurred in one hundred and eighty multilayer ceramic capacitors among one thousand multilayer ceramic capacitors.

In Examples 11 and 12, the ratio between the area of the recess and the area of the external electrode surface was equal to or greater than about 34.9%. Therefore, in Example 11, appearance was poor in ten multilayer ceramic capacitors among one thousand multilayer ceramic capacitors, and in Example 12, appearance was poor in forty-five multilayer ceramic capacitors among one thousand multilayer ceramic capacitors.

In Examples 18 and 19, the ratio between the depth of the recess and the thickness of the third plated layer was equal to or less than about 2.58. Therefore, in Example 18, halation occurred in one hundred and sixty multilayer ceramic capacitors among one thousand multilayer ceramic capacitors, and in Example 19, halation occurred in two hundred and ninety multilayer ceramic capacitors among one thousand multilayer ceramic capacitors.

In Example 21, the ratio between the depth of the recess and the thickness of the third plated layer was equal to or greater than about 40%. Therefore, appearance was poor in one hundred and twenty multilayer ceramic capacitors among one thousand multilayer ceramic capacitors.

In the results above, in Examples 1 to 7, 10, 13 to 17, and 20, the ratio between the area of the recess and the area of the external electrode surface was not less than about 1.1% and not greater than about 34.9%. Therefore, halation occurred in zero multilayer ceramic capacitors or in relatively few of the multilayer ceramic capacitors, and appearance was also poor in zero multilayer ceramic capacitors or in relatively few of the multilayer ceramic capacitors.

In Examples 1 to 7, 10, 13 to 17, and 20, the ratio between the depth of the recess and the thickness of the third plated layer was not less than about 2.5% and not greater than about 40%. Therefore, halation occurred in zero multilayer ceramic capacitor or in relatively few multilayer ceramic capacitors, and appearance was also poor in zero multilayer ceramic capacitor or in relatively few multilayer ceramic capacitors.

In Comparative Example, no recess was provided in the external electrode surface. Therefore, halation occurred in 752 multilayer ceramic capacitors among one thousand multilayer ceramic capacitors.

As seen in the results above, the recess in the surface of the external electrode of the multilayer ceramic capacitor leads to reduced flatness of the external electrode surface, and luminance of light reflected at the surface of the multilayer ceramic capacitor can be reduced or prevented in visual inspection with an image sensor or the like of a mounter in mounting the multilayer ceramic capacitor. Consequently, it was confirmed that halation could be reduced or prevented and the appearance of the multilayer ceramic capacitor could be accurately recognized.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of layered ceramic layers and a plurality of internal electrode layers, the multilayer body including a first main surface and a second main surface opposed to each other in a height direction, a first side surface and a second side surface opposed to each other in a width direction orthogonal or substantially orthogonal to the height direction, and a third side surface and a fourth side surface opposed to each other in a length direction orthogonal or substantially orthogonal to the height direction and the width direction; and
a plurality of external electrodes on the first, second, third, and fourth side surfaces of the multilayer body; wherein
the plurality of external electrodes include:
a first external electrode covering a portion of the first main surface, a portion of the first side surface, and a portion of the third side surface;
a second external electrode covering a portion of the first main surface, a portion of the second side surface, and a portion of the fourth side surface;
a third external electrode covering a portion of the first main surface, a portion of the first side surface, and a portion of the fourth side surface; and
a fourth external electrode covering a portion of the first main surface, a portion of the second side surface, and a portion of the third side surface;
the first external electrode, the second external electrode, the third external electrode, and the fourth external electrode each include an underlying electrode layer and a plated layer on the plurality of internal electrode layers;
a relationship between a dimension of the multilayer body in the width direction and a dimension of the multilayer body in the length direction satisfies about $0.85 \leq W/L \leq$ about $1.0$;
a recess is provided in a surface of at least two external electrodes of the first external electrode to the fourth external electrode on the first main surface; and
the recess has a size not less than about 1.1% and not greater than about 34.9% of an area of the respective external electrode on the first main surface.

2. The multilayer ceramic capacitor according to claim 1, wherein a relationship between a dimension of the multilayer ceramic capacitor in the width directions and a dimension of the multilayer ceramic capacitor in the length direction satisfies about $0.85 \leq W/L \leq$ about $1.0$.

3. The multilayer ceramic capacitor according to claim 2, wherein a dimension of the multilayer ceramic capacitor in the height direction is not less than about 0.04 mm and not greater than about 0.3 mm.

4. The multilayer ceramic capacitor according to claim 3, wherein the first external electrode, the second external electrode, the third external electrode, and the fourth external electrode each include an underlying electrode layer on the first main surface, and a plated layer on the underlying electrode layer.

5. The multilayer ceramic capacitor according to claim 4, wherein the plated layer includes a Sn plated layer as a top surface layer.

6. The multilayer ceramic capacitor according to claim 5, wherein the recess has a depth not less than about 2.5% and not greater than about 40% of a thickness of the Sn plated layer.

7. A multilayer ceramic capacitor comprising:
a multilayer body including a plurality of layered ceramic layers and a plurality of internal electrode layers, the multilayer body including a first main surface and a second main surface opposed to each other in a height direction, a first side surface and a second side surface opposed to each other in a width direction orthogonal or substantially orthogonal to the height direction, and a third side surface and a fourth side surface opposed to each other in a length direction orthogonal or substantially orthogonal to the height direction and the width direction; and a plurality of external electrodes on the first, second, third, and fourth side surfaces of the multilayer body; wherein the plurality of external electrodes include:
- a first external electrode covering a portion of the first main surface, a portion of the first side surface, and a portion of the third side surface;
- a second external electrode covering a portion of the first main surface, a portion of the second side surface, and a portion of the fourth side surface;
- a third external electrode covering a portion of the first main surface, a portion of the first side surface, and a portion of the fourth side surface; and
- a fourth external electrode covering a portion of the first main surface, a portion of the second side surface, and a portion of the third side surface;

the first external electrode, the second external electrode, the third external electrode, and the fourth external electrode each include an underlying electrode layer and a plated layer on the plurality of internal electrode layers;

a relationship between a dimension of the multilayer body in the width direction and a dimension of the multilayer body in the length direction satisfies about $0.85 \leq W/L \leq$ about 1.0;

a recess is provided in a surface of at least two external electrodes of the first external electrode to the fourth external electrode on the first main surface; and a diameter of the recess is not less than about 20 μm and not greater than about 150 μm.

8. The multilayer ceramic capacitor according to claim 7, wherein a relationship between a dimension of the multilayer ceramic capacitor in the width directions and a dimension of the multilayer ceramic capacitor in the length direction satisfies about $0.85 \leq W/L \leq$ about 1.0.

9. The multilayer ceramic capacitor according to claim 8, wherein a dimension of the multilayer ceramic capacitor in the height direction is not less than about 0.04 mm and not greater than about 0.3 mm.

10. The multilayer ceramic capacitor according to claim 9, wherein the first external electrode, the second external electrode, the third external electrode, and the fourth external electrode each include an underlying electrode layer on the first main surface, and a plated layer on the underlying electrode layer.

11. The multilayer ceramic capacitor according to claim 10, wherein the plated layer includes a Sn plated layer as a top surface layer.

12. The multilayer ceramic capacitor according to claim 11, wherein the recess has a depth not less than about 2.5% and not greater than about 40% of a thickness of the Sn plated layer.

* * * * *